(12) United States Patent
Yoshikawa et al.

(10) Patent No.: US 7,480,218 B2
(45) Date of Patent: Jan. 20, 2009

(54) OPTICAL DISK CONTROL DEVICE WITH FOCAL POINT MOVEMENT CONTROL

(75) Inventors: Akira Yoshikawa, Nara (JP); Shin-ichi Yamada, Katano (JP)

(73) Assignee: Panasonic Corporation, Osaka (JP)

( * ) Notice: Subject to any disclaimer, the term of this patent is extended or adjusted under 35 U.S.C. 154(b) by 420 days.

(21) Appl. No.: 10/553,616

(22) PCT Filed: Apr. 16, 2004

(86) PCT No.: PCT/JP2004/005510
§ 371 (c)(1),
(2), (4) Date: Oct. 18, 2005

(87) PCT Pub. No.: WO2004/093067
PCT Pub. Date: Oct. 28, 2004

(65) Prior Publication Data
US 2006/0209646 A1     Sep. 21, 2006

(30) Foreign Application Priority Data

Apr. 18, 2003 (JP) .............................. 2003-113854
May 30, 2003 (JP) .............................. 2003-155341

(51) Int. Cl.
*G11B 7/09* (2006.01)
(52) U.S. Cl. ................ 369/44.29; 369/53.37
(58) Field of Classification Search ........................ None
See application file for complete search history.

(56) References Cited

U.S. PATENT DOCUMENTS

| | | | | |
|---|---|---|---|---|
| 4,611,319 A | * | 9/1986 | Naito | 369/47.45 |
| 5,754,507 A | * | 5/1998 | Nishikata | 369/44.29 |
| 5,859,824 A | * | 1/1999 | Izumi et al. | 369/44.29 |
| 5,901,122 A | * | 5/1999 | Inoue | 369/44.29 |
| 6,240,054 B1 | * | 5/2001 | Takeya et al. | 369/44.29 |
| 6,400,663 B1 | * | 6/2002 | Okada et al. | 369/44.29 |
| 2001/0026506 A1 | * | 10/2001 | Shimamura et al. | 369/44.27 |
| 2003/0067850 A1 | | 4/2003 | Takahashi et al. | |

FOREIGN PATENT DOCUMENTS

JP          5-334687          12/1993

\* cited by examiner

*Primary Examiner*—Michael V. Battaglia
(74) *Attorney, Agent, or Firm*—Hamre, Schumann, Mueller & Larson, P.C.

(57) ABSTRACT

The present invention provides an optical disk control device that can perform focus pulling in a short time for a target information surface of an optical disk having a plurality of information surfaces. An objective lens (23) is moved toward an optical disk (1) having a plurality of information surfaces (1A, 1B) by the output signal of a driving signal generating circuit (42B), passage of an initial focused focal position is detected by a focal point passage detecting circuit (44), and when the objective lens moves past that position only a predetermined amount closer to the optical disk, an n-rotation delay circuit (70) outputs a reversal instruction f. After changing directions and moving the objective lens away from the optical disk, a focus pulling-in circuit (32B) switches a signal "a" that is output to an actuator driving circuit (21) from the output signal of the driving signal generating circuit to the output signal of the control circuit, activates a control circuit and performs focus pulling-in.

5 Claims, 15 Drawing Sheets

OPTICAL DISK CONTROL DEVICE WITH FOCAL POINT MOVEMENT CONTROL

TECHNICAL FIELD

The present invention relates to an optical disk control device that optically records a signal on an information carrier (optical disk) by using a light source such as a laser, or reproduces a signal from an information carrier, and particularly relates to a disk control device that performs focus control that controls the focal point of a light beam.

BACKGROUND ART

In order to optically perform recording/reproduction of information on an information carrier using a light source, it is necessary to perform focus control such that the information surface of the information carrier is always at the focal point (convergent point) position of the light beam. In order to realize this, prior to focus control, a so-called focus pulling-in action is performed that moves the objective lens and brings the focal position of the light beam to the information surface of the information carrier.

Conventional optical disk control devices attempt to realize a reduction in the size of the optical pickup (for example, see JP H05-334687A) by shortening the distance between the information surface and the objective lens, a so-called working distance (hereinafter, referred to as "WD").

Below, a conventional optical disk control device will be explained with reference to FIG. 14, FIG. 15, and FIG. 16.

FIG. 14 is a block diagram showing an example of a configuration of a conventional optical disk control device.

In FIG. 14, a sawtooth-shaped wave signal generating circuit 45 outputs a sawtooth-shaped wave signal with gradually increasing amplitude. A switching circuit 31 switches between the output signal of the sawtooth-shaped wave signal generating circuit 45 and the output signal of a control circuit 20 and feeds one of these to an actuator driving circuit 21 as a signal "a", and the actuator driving circuit 21, by operating an actuator 22 in response to the signal "a", drives an objective lens 23.

A focus error detecting circuit 12 outputs a focus error signal b that indicates the amount of displacement between the focal point position of the objective lens 23 and an information surface 2A of an optical disk 2, the details of which will be stated below. A focus pulling-in circuit 32F determines the level of the focus error signal b, and by giving an instruction g to the switching circuit 31 a focus pulling-in action is realized.

FIG. 15 is a circuit diagram showing an example of the internal configuration of the focus error detecting circuit 12 in FIG. 14. In FIG. 15, the focus error detecting circuit 12 generates a focus error signal b by an astigmatic method wherein, from a signal detected in response to an incident light beam spot 302 by a quartered photodetector 301 in an optical pickup 3, two adders 1201 and 1202 generate sum signals (A+D) and (B+C), which are the diagonal partial sums of the quartered photodetector 301, and a subtracter 1203 generates a differential signal of (A+C)−(B+D).

Next, the focus pulling action in a conventional optical disk control device configured as described above will be explained with reference to FIG. 16. FIG. 16 is a waveform diagram of the signals in various parts of the optical disk control device of FIG. 14.

When a focus pulling-in instruction h is output from a system controller 30, the objective lens 23 is driven via the actuator driving circuit 21 and the actuator 22, based on a sawtooth-shaped wave signal with sequentially changing amplitude that is output from the sawtooth-shaped wave signal generating circuit 45. The amplitude of that sawtooth-shaped wave signal gradually increases, and when the focal point of the objective lens 23 reaches the information surface 2A, the focus pulling-in circuit 32F determines the level of the focus error signal b that is output from the focus error detecting circuit 12, and at the timing that the level reaches the focus pulling-in level, outputs the switching instruction g to the switching circuit 31. By switching the signal "a" that is output to the actuator driving circuit 21 from the output signal of the sawtooth-shaped wave generating circuit 45 to the output signal of the control circuit 20 along with activating the control circuit 20, a focus pulling-in action is performed.

In this sort of optical disk control device, because the amplitude of the sawtooth-shaped wave signal is gradually increased, it takes time for the focus error signal to be detected, and as a result, time is required for the focus pulling-in action.

In particular, when the space between the optical disk and the objective lens increases due to surface oscillation of the optical disk or drooping of the objective lens, the time until the focus error signal is detected increases. Thus, the time required for the focus pulling-in action is increased further.

There is also the problem that focus pulling cannot be performed on the target information surface when the optical disk has a plurality of information surfaces, because it is not possible to discern to which information surface the detected focus error signal corresponds.

Particularly, because more focus error signals are detected the further the target information surface gets from the objective lens, pulling the focus to the target information surface is difficult

DISCLOSURE OF THE INVENTION

The present invention was made in consideration of the above problems, and it is an object thereof to provide an optical disk control device that can perform focus pulling-in for a target information surface in a short period of time, even when a plurality of information surfaces is present inside the optical disk.

(Means for Solving the Above-Mentioned Problems)

In order to attain the objectives described above, the optical disk control device according to the present invention has a configuration comprising a converging projecting means, a focus moving means, a focus error detecting means, a focal point passage detecting means, a reversal instruction means, a driving signal generating means, a controlling means, and a focus pulling-in means.

The converging projecting means converges and projects a light beam via an objective lens to an information carrier having a plurality of information surfaces. The focus-moving means, by moving the objective lens, moves the focal point of the light beam converged by the converging projecting means in the normal direction of the surface of the information carrier. The focus error detecting means generates a focus error signal in response to the positional displacement of the focal point of the light beam on each information surface of the information carrier. The focal point passage detecting means detects passage of the focal point of the light beam past the surface and the information surfaces of the information carrier. The reversal instruction means outputs a reversal instruction using the output signal from the focal point passage detecting means. The driving signal generating means outputs a signal to the focus moving means to move the objective lens toward the information carrier and switches the signal to move the objective lens away from the information carrier in response to the reversal instruction. The controlling means controls the focus moving means using the focus error signal such that the focal point follows each information surface of the information carrier. The focus pulling-in means switches action from the driving signal generating means to the control means, and a focus pulling-in action is performed by the focus-moving means.

With this configuration, it is possible for the objective lens to begin the focus pulling-in action immediately without repeating vertical action, and the time required for the focus pulling-in action can be shortened. Further, by moving the objective lens toward the information carrier and then changing its direction immediately after passing the focal point, unnecessary movement of the objective lens toward the information carrier can be prevented, and even when the WD of the objective lens is short, it is possible to prevent collisions between the objective lens and the information carrier.

Also, the optical disk control device according to the present invention has a configuration wherein the slope of the driving waveform is changed gradually at the switching point of the output signal from the driving signal generating means between movements of the objective lens toward and away from the information carrier.

With this configuration, it is possible to prevent counteraction and oscillation of the objective lens caused by inertia, a stable focus error signal can be obtained at all times, an unstable focus error signal is not generated, and stability also can be secured for the focus pulling-in action.

The optical disk control device according to the present invention has a configuration wherein an aberration setting is performed for the target information surface of the information carrier having a plurality of information surfaces, and from the amplitude value of the focus error signal the target information surface is discriminated. In this case, it is desirable to discriminate the target information surface by detecting the phase relationship between the focus error signal and the reflected light quantity signal, based on the level of the reflected light quantity signal when the focus error signal becomes maximum and minimum, and on the maximum value of the level of the reflected light quantity signal.

With this configuration, it is possible to discriminate correctly the focus error signal of the target information surface from among a plurality of focus error signals detected from an information carrier having a plurality of information surfaces, and it is also possible when pulling the focus to pull focus on the target information surface reliably.

Also, the optical disk control device according to the present invention has a configuration wherein an objective lens is moved toward an information carrier having a plurality of information surfaces, and when passage of the initial focal point position is detected, the objective lens is moved only a predetermined amount closer to the information carrier from that position, and after changing direction and moving the objective lens away from the information carrier, a focus pulling-in action is performed by a focus pulling-in means.

With this configuration, by moving the objective lens only a predetermined amount closer to the information carrier from the initial focal point, movement of the objective lens unnecessarily close to the information carrier is prevented, and it is possible to prevent collisions between the objective lens and the information carrier even when there is a short WD. In addition, because it is not necessary to discriminate whether an information surface of an information carrier having a plurality of information surfaces is the target information surface, erroneous-focus pulling due to discrimination error and collisions between the objective lens and the information carrier can be avoided. Further, even if discrimination of the information surfaces is not performed, by regulating the predetermined amount of movement of the objective lens, it becomes possible to perform focus pulling-in for the target information surface.

Also, the optical disk control device according to the present invention has a configuration wherein, for an information carrier having a plurality of information surfaces, by detecting the focal point position of the light beam from the order in which the maximum and the minimum values of the focus error signal are shown, the target information surface is discriminated.

With this configuration, it is possible to discriminate correctly the focus error signal of the target information surface from among a plurality of focus error signals detected from an information carrier having a plurality of information surfaces inside, and it is also possible when pulling the focus to reliably pull focus on the target information surface.

Further, the optical disk control device according to the present invention has a configuration provided with, for an information carrier having a plurality of information surfaces, a surface discriminating means that discriminates whether a surface detected by a focal point passage detecting means is a designated surface included in the information carrier; a movement amount setting means that sets the amount of movement to be traveled by the objective lens based on the output signal from the surface discriminating means; a movement amount managing detecting means B that manages and detects movement only of the prescribed amount B, wherein the focal point has been set by the movement amount setting means after the focal point passage detecting means detects passage of the focal point; and a reversal instruction means that outputs a reversal instruction using the output signal from the movement amount managing detecting means B.

With this configuration, it is possible to establish that the surface discriminated by the surface discriminating means is an information surface provided inside the information carrier, and by moving from the discriminated information surface to the target information surface, it is possible to achieve speed and reliability of the focus pulling-in action.

BEST MODE FOR CARRYING OUT THE INVENTION

Below, embodiments suitable for carrying out the present invention are explained in detail with reference to the accompanying drawings.

Embodiment 1

Figure 1:
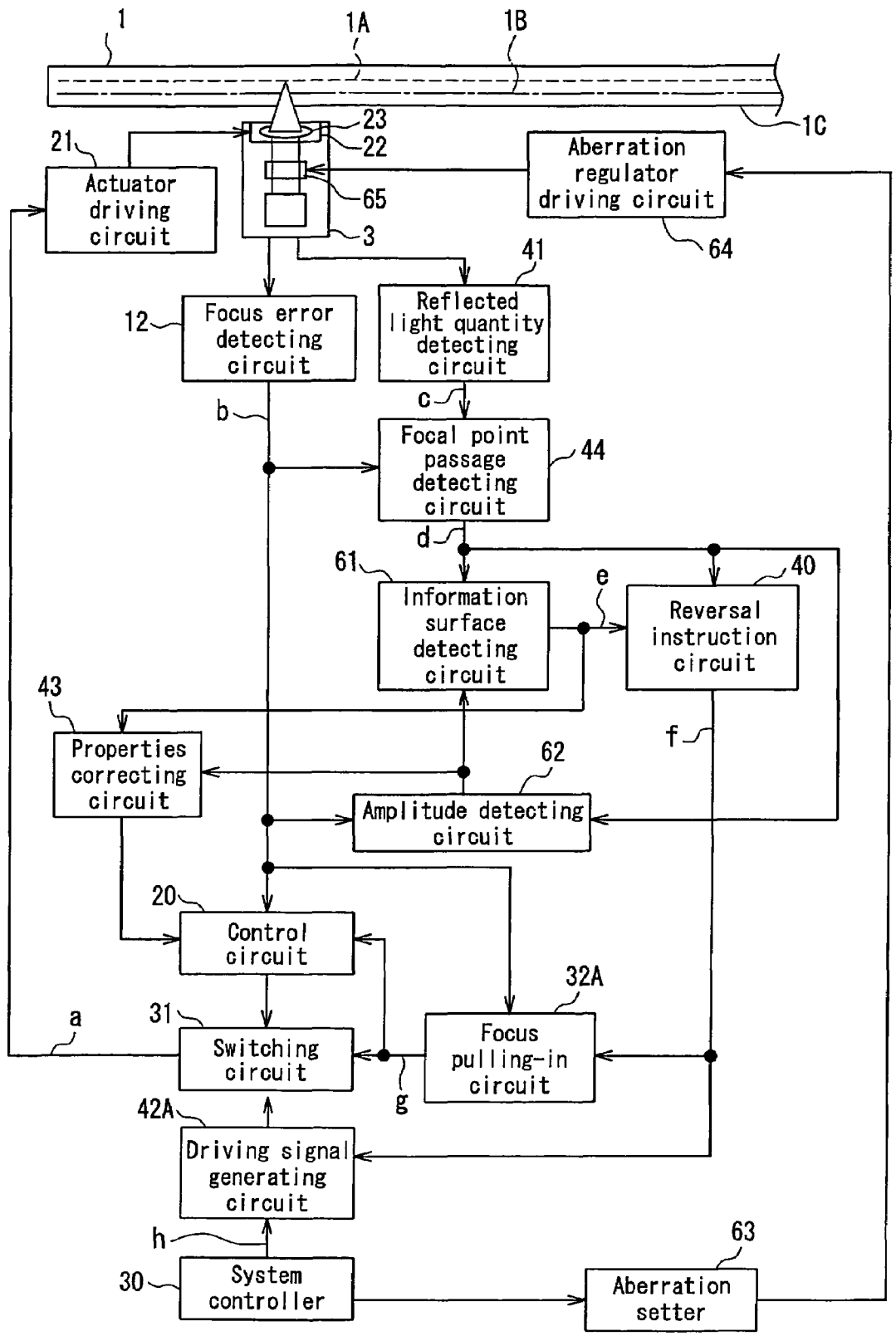
FIG. 1 is a block diagram showing one example of a configuration of the optical disk control device according to Embodiment 1 of the present invention.

FIG. 1 is a block diagram showing an example configuration of the disk control device according to Embodiment 1 of the present invention. In FIG. 1, elements of the configuration that are the same as those in the conventional example are given the same numbers, and their explanation is omitted here.

In FIG. 1, a disk 1 is a two-layer laminated disk having a second information surface 1B in addition to a first information surface 1A. An aberration setter 63 outputs an aberration setting value such that no spherical aberration occurs in the light beam for the information surface designated by the system controller 30. Using the setting value of the aberration setter 63, an aberration regulator 65 controls the spherical aberration of the focal point of the light beam via an aberration regulator driving circuit 64.

A reflection light quantity detecting circuit 41 outputs a signal c (hereinafter, referred to as a "reflected light quantity signal c") proportional to the quantity of light reflected from the disk 1. A focal point passage detecting means 44 identifies an S-shaped waveform of the focus error signal b output from the focus error detecting circuit 12 when the reflected light quantity signal c from the reflected light quantity detecting circuit 41 becomes greater than a predetermined value C1v1 and detects that the focal point has been passed when the reflected light quantity signal c becomes smaller than the predetermined value C1v1.

An amplitude detecting circuit 62 detects the amplitude of the S-shaped waveform of the focus error signal b, based on the focus error signal b and a focal point passage signal d output from the focal point passage detecting circuit 44. The information surface detecting circuit 61 detects that the target information surface on which focus should be pulled has been passed if the amplitude value output from the amplitude detecting circuit 62 is larger than a predetermined value Bcmp when a signal is output from the focal point passage detecting circuit 44.

When the information surface detecting circuit 61 detects the target information surface, a property correcting circuit 43 corrects the gain setting of the control circuit 20 based on the ratio of an amplitude value b1A of the S-shaped waveform output from the amplitude detecting circuit 62 and a standard value Bstd.

A reversal instruction circuit 40 outputs a reversal instruction f to a focus pulling circuit 32A and a driving signal generating circuit 42A if the information surface detecting circuit 61 detects that the target information surface has been passed. The driving signal generating circuit 42A, when outputting a signal to move the objective lens 23 toward or away from the disk 1, outputs the signal such that the slope of the driving waveform does not change abruptly and such that the slope changes smoothly, and when started by the system controller 30, initially outputs a driving signal for a fixed period of time such that the objective lens 23 moves away from the disk 1, then changes direction, and outputs a driving signal such that the objective lens 23 moves toward the disk 1. The reversal instruction circuit 40 outputs the reversal instruction f. The focus pulling-in circuit 32A determines the level of the focus error signal b under the condition that the objective lens 23 is already in a reversed state, and by sending the instruction g to the switching circuit 31, realizes a focus pulling-in action.

Next, the action of the disk control device configured as described above will be explained with reference to FIG. 2 and FIG. 3, in addition to FIG. 1.

Figure 2:
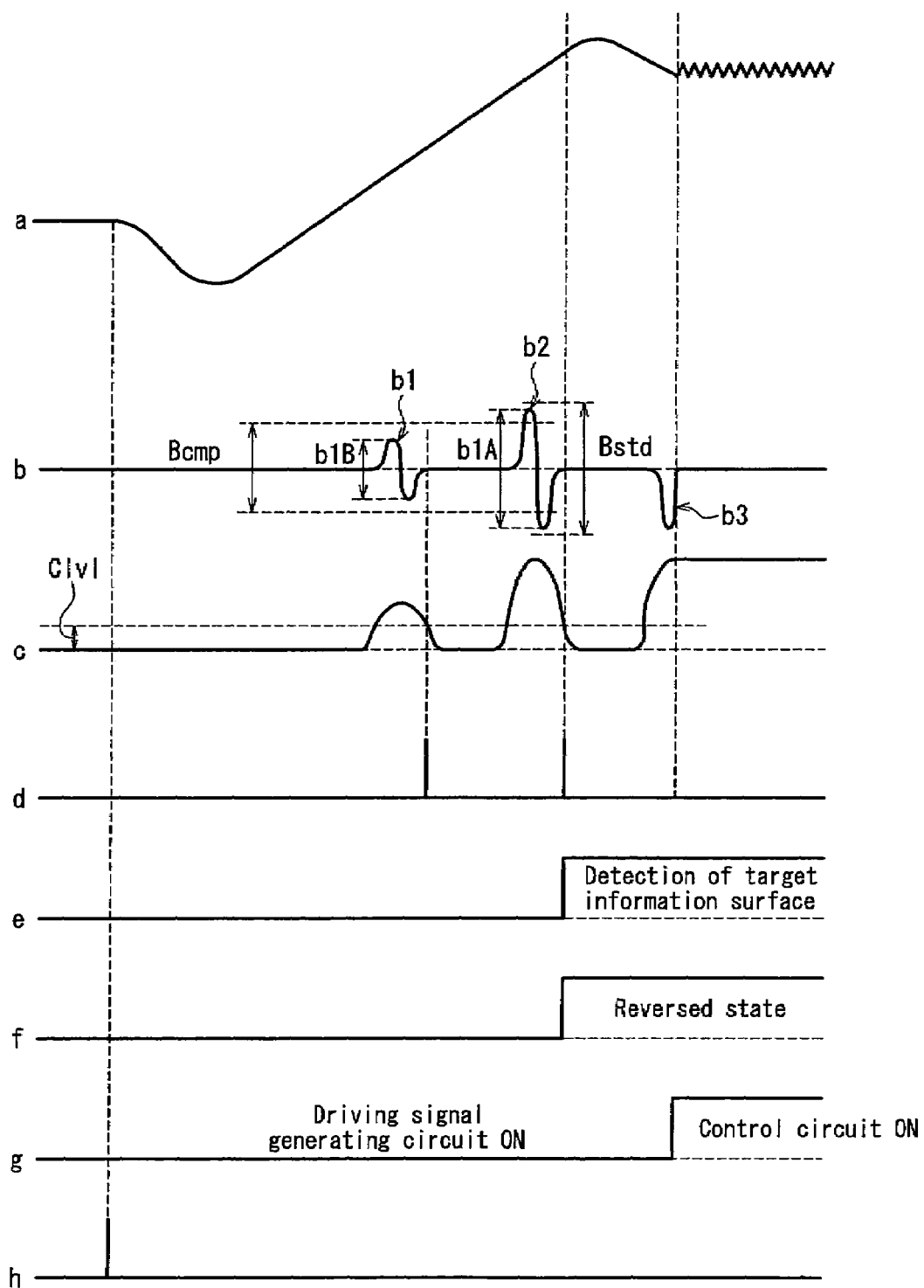
FIG. 2 is a waveform diagram of the signals in various parts of the optical disk control device of FIG. 1.

FIG. 2 is a waveform diagram of the signals in various parts of the optical disk control device of FIG. 1. The focus pulling-in instruction h from the system controller 30 and information of a target information surface (in the present embodiment, a first information surface 1A) are sent respectively to the driving signal generating circuit 42A and the aberration setter 63. The aberration setter 63 adjusts the aberration adjuster 65 such that there is no spherical aberration for the designated first information surface 1A. At the same time, the driving signal generating circuit 42A outputs a driving signal in the direction that will move the objective lens 23 away from the disk 1, such that the change in the slope of the driving waveform does not become abrupt. After moving the objective lens 23 a prescribed distance away from the disk 1, the driving signal generating circuit 42A switches the driving signal to a direction that will move the objective lens 23 toward the disk 1, such that the change in the slope of the driving waveform does not become abrupt. When the objective lens 23 moves toward the disk 1, its focal point passes a second information surface 1B, and an S-shaped waveform b1 is output from the focus error detecting circuit 12 when the focal point passes the second information surface 1B.

Figure 3A:
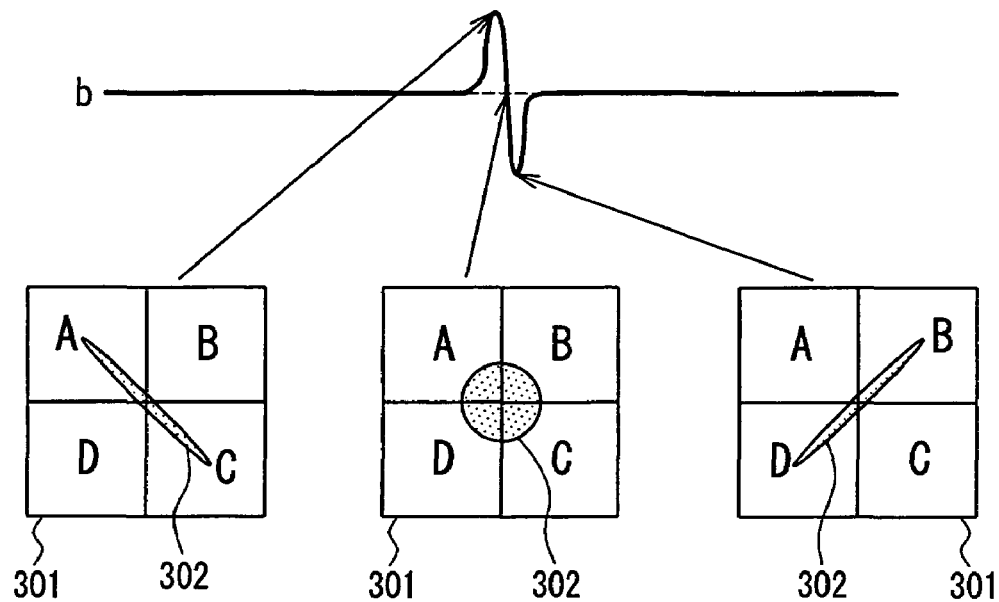
FIG. 3A is a diagram showing the shape of the light beam spot 302 on the quartered light beam detector 301 at various points of the S-shaped waveform of the focus error signal b of FIG. 1 when there is no spherical aberration.
Figure 3B:
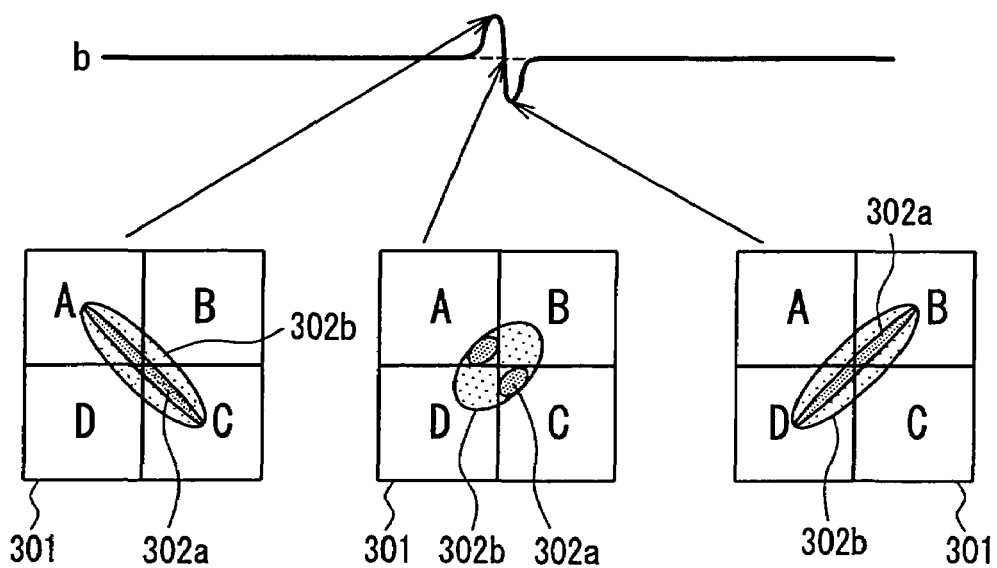
FIG. 3B is a diagram showing the shape of the light beam spot 302 on the quartered light beam detector 301 at various points of the S-shaped waveform of the focus error signal b of FIG. 1 when there is spherical aberration.

The S-shaped waveform without spherical aberration and the S-shaped waveform with spherical aberration are explained here with reference to FIG. 3A and FIG. 3B. FIG. 3A and FIG. 3B are diagrams respectively showing the shape of the light beam spot 302 on the quartered light beam detector 301 at various points of the S-shaped waveform without spherical aberration and with spherical aberration.

As shown in FIG. 3A, without spherical aberration, the shape of the light beam spot 302 becomes a thin line at the peak and the bottom of the S-shaped waveform. By contrast, as shown in FIG. 3B, with spherical aberration, the way in which the light beam converges is different between at the center and at the periphery of the objective lens 23, and therefore a variation of the optical power occurs within the light beam spot (a central light beam spot 302a, and a peripheral light beam spot 302b). The shape of the light beam spot at the peak and bottom of the S-shaped waveform does not become a thin line, the absolute values of the peak and the bottom of the S-shaped waveform therefore become small, and its amplitude as an S-shaped waveform becomes small.

In this manner, an amplitude value (b1B) of the S-shaped wave b1 for the second information surface 1B, wherein the amplitude is decreased because there is spherical aberration, is input to the information surface detecting circuit 61 and compared to the predetermined value (Bcmp), and the second information surface 1B is determined not to be the target information surface. When the objective lens 23 moves toward the disk 1, its focal point passes the first information surface 1A, and due to passing the focal point for the first information surface 1A, an S-shaped wave b2 is output from the focus error detecting circuit 12. The same as in the case of the second information surface 1B, the information surface detecting circuit 61 determines the S-shaped wave to be that of the target information surface because the amplitude (b1A) of the S-shaped wave b2 that is output with the timing of the focal point passage signal d is larger than the predetermined value (Bcmp).

When the information surface detecting circuit 61 detects the target information surface (in the present embodiment, the first information surface 1A), the reversal instruction circuit 40 outputs the reversal instruction f to the focus pulling-in circuit 32A and the driving signal generating circuit 42A. The driving signal generating circuit 42A receives the reversal instruction, and switches the driving signal in the direction for moving the objective lens 23 away from the disk 1 such that the change in the slope of the driving waveform does not become abrupt. At the same time, when the information surface is detected, the property correcting circuit 43 compares the amplitude value (b1A) of the S-shaped waveform b2 for the first information surface 1A, output from the amplitude detecting circuit 62, to the standard amplitude value Bstd, and from that ratio adjusts the gain setting of the control circuit 20 such that the control gain after pulling the focus is appropriate. At the same time, the focus pulling-in circuit 32A that received the reversal instruction f has become able to perform a focus pulling-in action by judging the level of the focus error signal b.

The objective lens 23 starts to move in the direction away from the disk 1, and when the S-shaped wave b3 is output from the focus error detection circuit 12, the focus pulling-in circuit 32A determines the level of the focus error signal b (b3), and outputs the switching instruction g to the switching circuit 31 at the timing that the level reaches the focus pulling-in level. By switching the signal "a" that is output to the actuator driving circuit 21 from the output signal of the driving signal generating circuit 42A to the output signal of the control circuit 20, and also starting the control circuit 20, a focus pulling-in action is performed.

In the above manner, with the present embodiment, after moving the objective lens 23 a predetermined distance away from the disk 1 with the output signal from the driving signal generating circuit 42, then changing direction and moving the objective lens 23 toward the disk 1, and driving such that when detecting from the focus error signal that the focused focal position of the target information surface has been passed, the direction is changed immediately and the objective lens 23 is moved away from the disk 1, and next performing a focus pulling-in action using the focus error signal that is generated, it is possible to begin the focus pulling-in action directly without repeating vertical action of the objective lens 23, and the time necessary for the focus pulling-in action can be reduced. Further, by moving the objective lens 23 toward the disk 1 and changing direction immediately after passing the focal point, movement of the objective lens 23 unnecessarily close to the disk 1 is prevented, and collisions between the objective lens 23 and the disk 1 can be prevented even when there is a short WD.

When the S-shaped waveform for the target information surface is detected, due to the property correcting circuit 43 optimizing the gain of the control circuit 20 based on the amplitude of that S-shaped waveform, the necessity of driving the objective lens 23 only for the purpose of learning the S-shaped amplitude is eliminated, and the time for the focus pulling-in action can be further shortened.

In addition, in order for the focal point pass detecting circuit 44 to detect passage past the focal point position, by using the focus error signal combined together with the reflected light quantity signal from the reflected light quantity detecting circuit 41, noise is removed from the focus error signal, and by performing accurate focal point detection, it is possible to realize a stable focus pulling-in action.

Further, when the output signal of the driving signal generating circuit 42A changes the direction of movement of the objective lens 23, by gradually changing that direction such that the change in the slope of the driving waveform thereof does not become abrupt, it is possible to prevent oscillation of the objective lens 23, there is no generation of an unstable focus error signal, and it is possible to realize a reliable focus pulling-in action with a stable focus error signal.

And, for the disk 1 having a plurality of information surfaces, by controlling aberration of the light beam using the aberration regulator 65, and setting the light beam such that there is no spherical aberration at the target information surface, it is possible to discriminate the target information surface from the amplitude of the S-shaped signal of the focus error signal b, and discriminating the target information surface of the disk 1 having a plurality of information surfaces with a simple configuration, it is possible to reliably pull the focus to that information surface.

In the present embodiment, the driving signal generating circuit 42 drives such that the objective lens 23 is initially moved away from the disk 1, but depending upon the position of the objective lens 23 at the start and the size of the surface vibration of the disk 1, it may also drive such that the objective lens is immediately moved toward the disk 1. The present invention is not limited to the configuration of the present embodiment.

Embodiment 2

Figure 4:
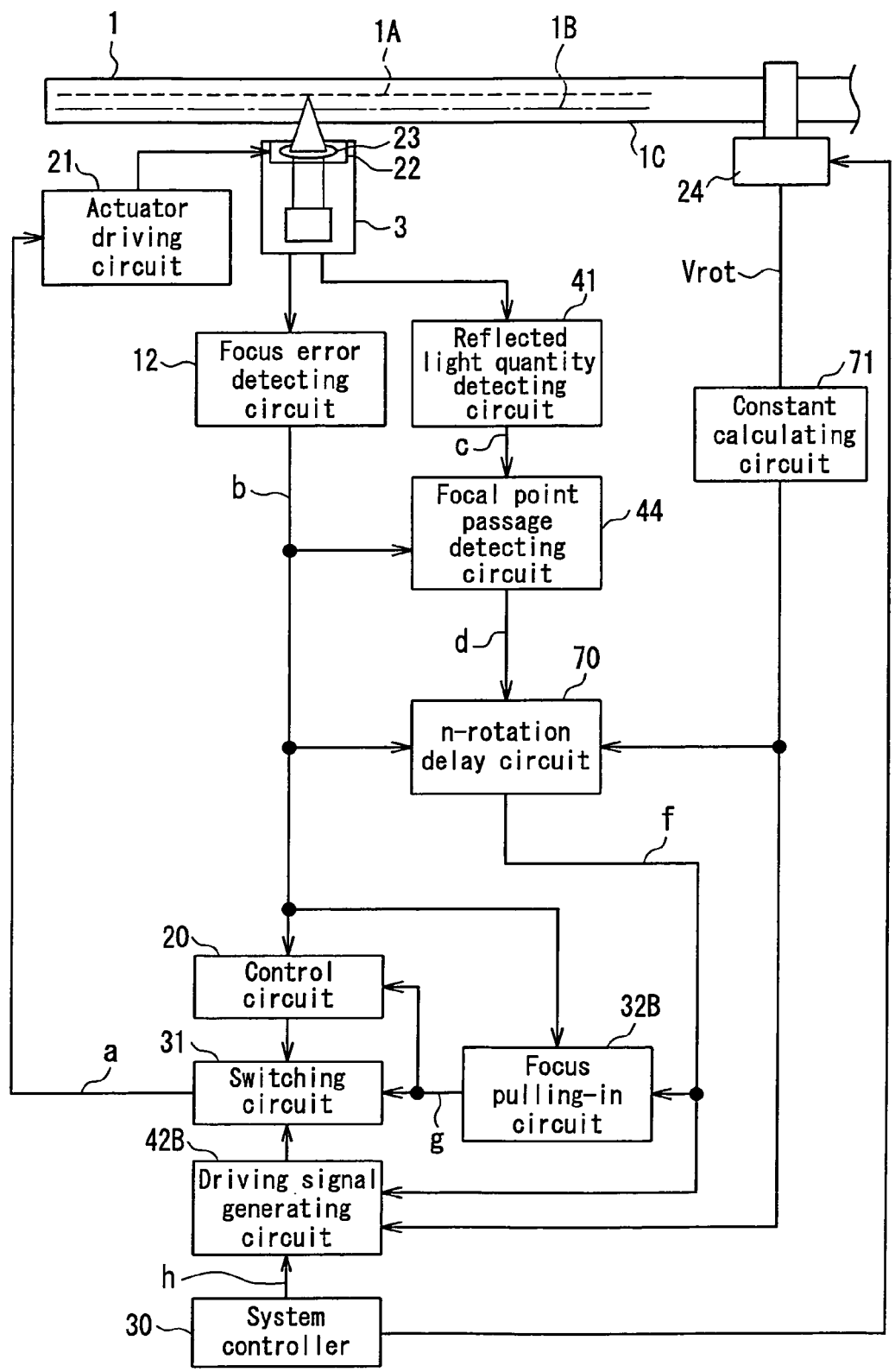
FIG. 4 is a block diagram showing one example of a configuration of the optical disk control device according to Embodiment 2 of the present invention.

FIG. 4 is a block diagram showing one example configuration of the optical disk control device according to Embodiment 2 of the present invention. In FIG. 4, the same elements of the configuration as in the conventional example and Embodiment 1 are given the same part numbers, and their explanation is omitted here.

In FIG. 4, a constant calculating circuit 71 calculates the number of rotations n set in an n-rotation delay circuit 70, based on a distance L by which the objective lens 23 should be brought near the disk 1 after the focal point passage detecting circuit 44 detects the initial S-shaped waveform and a rotational velocity Vrot of a disk motor 24, and a driving velocity V1*ns* of the objective lens 23 set in the driving signal generating circuit 42, from the below equations (1) and (2).

$$n = K \times L \times V\text{rot} \quad (1)$$

$$V1ns = (L \times V\text{rot})/n \quad (2)$$

In the equation (2) above, K is a constant for keeping the driving velocity V1*ns* in a predetermined range.

Specifically, the number of rotations n is calculated as an integer by rounding from the result of equation (1). Here, as the predetermined distance L, at least a distance is secured over which the objective lens 23 must move in order to move the focal point of the objective lens 23 from a surface 1C to the first information surface 1A.

Then, the n-rotation delay circuit 70 outputs the reversal instruction f to the driving signal generating circuit 42A after n revolutions of the optical disk 1 after the zero-crossing point of the initial S-shaped waveform, based on the focus error signal b and a focal point passage signal d. The driving signal generating circuit 42B outputs a signal that moves the objective lens 23 toward or away from the optical disk 1, and at least the velocity at which the objective lens 23 moves toward the optical disk 1 is set by the constant calculating circuit 71. The focus pulling-in circuit 32B, under the condition that the n-revolutions delay circuit 70 has output the reversal instruction f and is already in a reversed state, determines the level of the focus error signal b, and by outputting the instruction g to the switching circuit 31 in response to the results of that judgment, realizes a focus pulling-in action.

Next, the action of the optical disk control device configured as described above is explained with reference to FIG. 5 and FIG. 6, in addition to FIG. 4.

Figure 5:
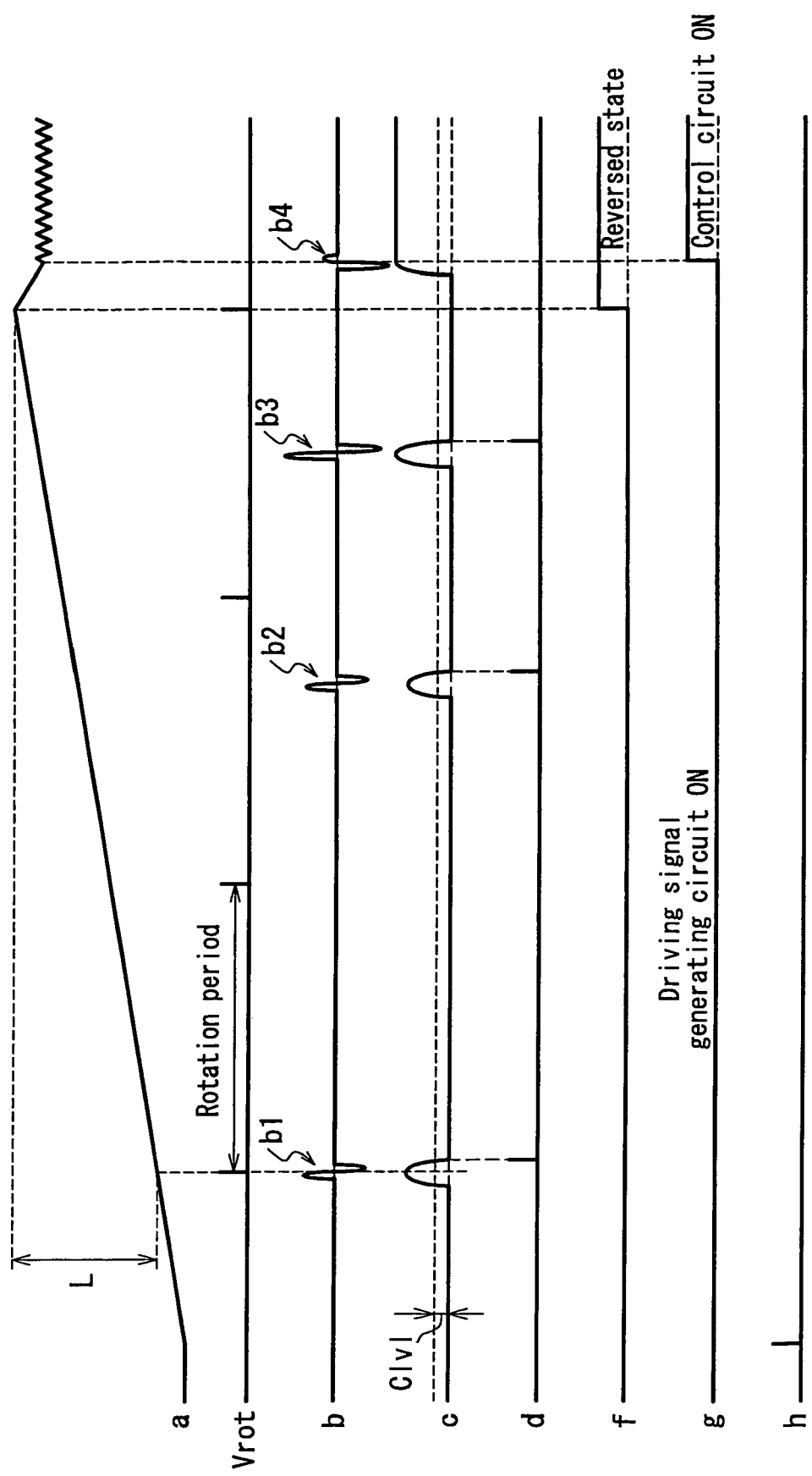
FIG. 5 is a waveform diagram of the various signals in FIG. 4 when the rotational velocity of the optical disk is comparatively fast.

FIG. 5 is a waveform diagram of the various signals in FIG. 4 when the rotational velocity Vrot of the optical disk 1 is comparatively fast.

First, the focus pulling-in instruction h is sent from the system controller 30 to the driving signal generating circuit 42B. At the same time, the constant calculating circuit 71 calculates the revolutions n (=3) and the velocity V1*ns* of the objective lens 23 from the rotational velocity Vrot of the optical disk 1 at that time using the above equations (1) and (2), and respectively sets those values in the n-rotation delay circuit 70 and the driving signal generating circuit 42B.

The driving signal generating circuit 42B outputs a driving signal at the driving velocity V1*ns* set by the constant calculating circuit 71 such that it moves the objective lens 23 toward the optical disk 1. When the objective lens 23 moves toward the optical disk 1, its focal point passes the surface 1C of the optical disk 1, and therefore the S-shaped waveform (b1) is output from the focus error detecting circuit 12. The n-rotation delay circuit 70, with the zero-crossing point of the initial S-shaped waveform as the starting point, outputs the reversal instruction f after a time period in which the optical disk 1 makes three rotations (during which the S-shaped waveform b2 for the second information surface 1B and the S-shaped waveform b3 for the first information surface 1A are output). This corresponds to the timing in which the objective lens 23 moves near the optical disk 1 only a predetermined distance L after the initial S-shaped wave b1 is detected.

The reversal instruction f that the n-rotation delay circuit 70 outputs is input to the focus pulling-in circuit 32B and the driving signal generating circuit 42B. The driving signal generating circuit 42B receives the reversal instruction, and switches to a driving signal in the direction that moves the objective lens 23 away from the optical disk 1. At the same time, the focus pulling-in circuit 32B that received the reversal instruction f has become able to perform a focus pulling-in action by judging the level of the focus error signal b.

Then, the objective lens 23 moves in the direction away from the optical disk 1, and when the S-shaped waveform (b4) is output from the focus error detecting circuit 12, the focus pulling-in circuit 32B determines the level of the focus error signal b, outputs the switching instruction g to the switching circuit 31 at the timing at which that level reached the focus pulling-in level, and along with switching the source of the signal "a" that is delivered to the actuator driving circuit 21 from the driving signal generating circuit 42B to the control circuit 20, performs a focus pulling action for the first information surface 1A by starting the driving circuit 20.

Figure 6:
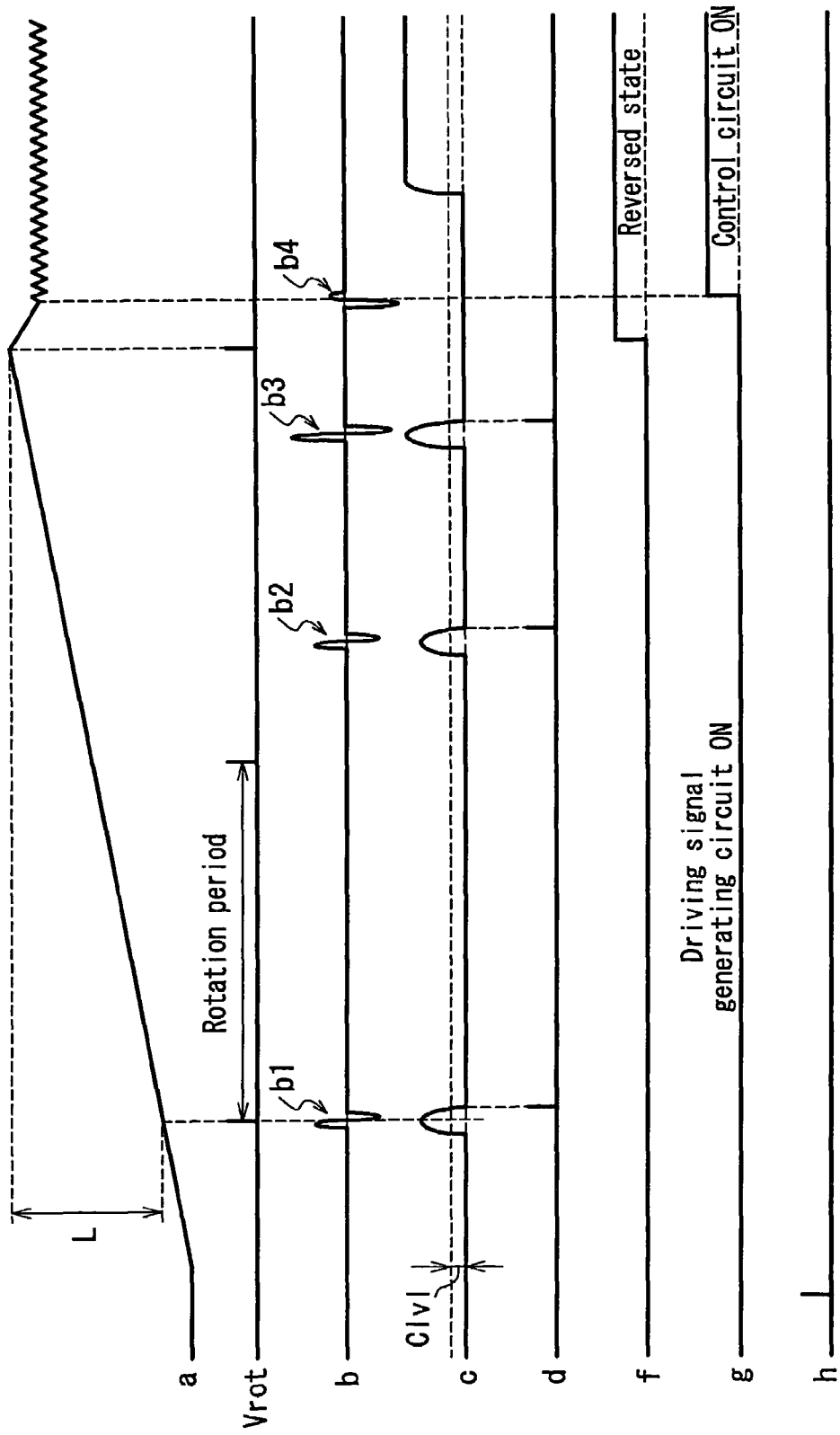
FIG. 6 is a waveform diagram of the various signals in FIG. 4 when the rotational velocity of the optical disk is comparatively slow.

FIG. 6 is a waveform diagram of the various signals in FIG. 4 when the rotational velocity Vrot of the optical disk 1 is comparatively slow.

The basic focus pulling-in action for the focus pulling-in instruction h from the system controller 30 is the same as when the rotational velocity Vrot of the optical disk 1 is comparatively fast, but due to the rotational velocity Vrot of the optical disk 1 being comparatively slow, the number of rotations n changes from 3 to 2, and the velocity V1*ns* of the objective lens 23 is set in response. In this case as well, the reversal instruction f output corresponds to a timing in which the objective lens 23 moved only a predetermined distance L toward the optical disk 1 after the initial S-shaped waveform b1 was detected.

In the above manner, in the present embodiment, the constant calculating circuit 71 calculates the number of rotations n set in the n-rotation delay circuit 70 and the driving velocity V1*ns* of the objective lens 23 that is set in the driving signal generating circuit 42B, from the rotational velocity Vrot of the optical disk 1 and the distance L that the objective lens 23 should be moved toward the optical disk 1 after detecting the initial S-shaped waveform b1. Accordingly, because it is possible for the objective lens 23 to begin the focus pulling-in action immediately without repeating a vertical action, it is possible to shorten the time required for the focus pulling-in action. Further, at the point in time that the objective lens 23 is moved toward the optical disk 1 and then only moved toward the optical disk 1 a predetermined distance L after the initial S-shaped waveform b1, by changing the direction of the objective lens 23, the objective lens 23 does not move unnecessarily close to the optical disk 1, and it is possible to prevent collisions between the objective lens 23 and the optical disk 1 even when there is a short WD.

By setting the timing that begins the judgment of the level of the focus error signal b in order to change the direction of the objective lens 23 and pull focus to be after n rotations (n being an integer) after the zero-crossing point of the initial S-shaped waveform b1, the focal point is guaranteed definitely to be behind the first information surface 1A when beginning to determine the level of the focus error signal b, even when the optical disk 1 has a component of vibration, and it is possible to pull the focus to the information surface 1A reliably.

Further, by calculating the number of rotations n and the lens movement velocity V1*ns* from the rotational velocity Vrot of the optical disk 1, a nearly fixed value is maintained for the lens movement velocity V1*ns* even if there is a mistake in the rotational velocity Vrot of the optical disk 1, and so it is possible to ensure reliability when pulling the focus. In addition, it is possible always to keep the amount of movement of the objective lens 23 from detection of the initial S-shaped waveform until after n-rotations of the optical disk 1 at the predetermined distance L, so it is possible to avoid having the objective lens 23 unnecessarily approach the optical disk 1. Because it is possible to drive the objective lens 23 without stopping, velocity switching points can be reduced, and it is possible to keep adverse affects due to vibration of the objective lens 23 at a minimum.

Moreover, when the focal point passage detecting circuit 44 detects passage of the focal point position by using the reflected light amount signal c from the reflected light amount detecting circuit 41 in addition to the focus error signal b, noise is eliminated in the focus error signal b, and by performing reliable focal point detection, it is possible to realize stable focus pulling-in.

In the present embodiment, the driving signal generating circuit 42B is explained as initially driving in the direction that moves the objective lens 23 toward the optical disk 1, but the present invention is not limited to such a configuration. In consideration of surface vibration of the optical disk 1, the driving signal generating circuit 42B also may drive such that initially it moves the objective lens 23 away from the optical disk 1 only a predetermined distance, and then such that it changes direction and moves the objective lens 23 toward the optical disk 1.

As a method that keeps the amount of movement of the objective lens 23 at the predetermined distance L, a configuration may be adopted such that the lens movement velocity V1$ns$ is fixed without relationship to the rotational velocity Vrot of the optical disk 1, and after the objective lens 23 moves for a predetermined distance L, is stopped at its location after n rotations of the optical disk 1, and changes direction until after n rotations of the optical disk 1 following initial S-shaped waveform detection, so that the present invention is not limited to the present embodiment. Likewise, it is possible to set the number of rotations n irrespective of the rotational velocity Vrot, and the present invention is not limited to the present embodiment.

Embodiment 3

Figure 7:
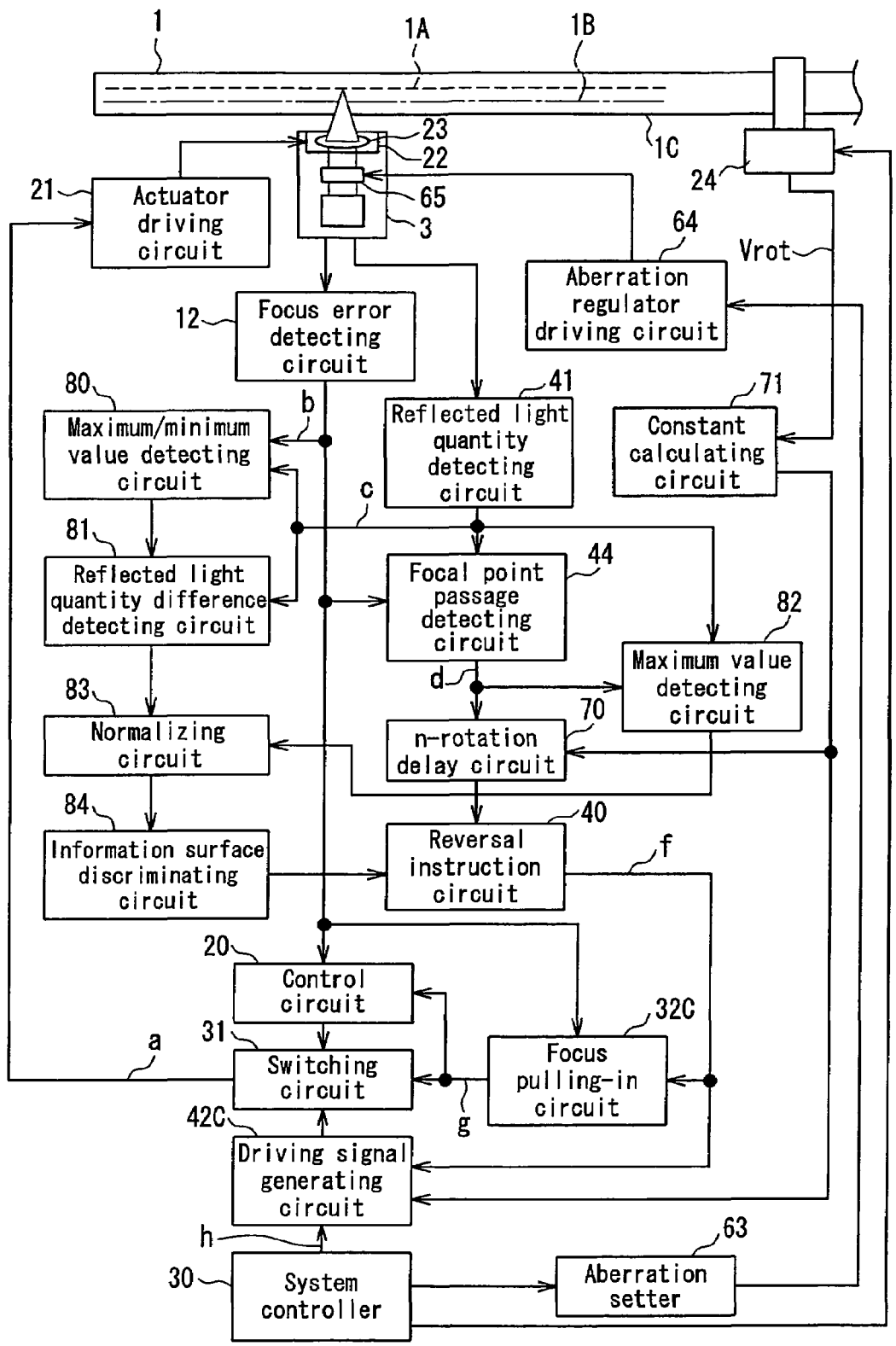
FIG. 7 is a block diagram showing one example of a configuration of the optical disk control device according to Embodiment 3 of the present invention.

FIG. 7 is a block diagram showing one example configuration of the optical disk control device according to Embodiment 3 of the present invention. In FIG. 7, the same essential elements of the configuration as in the conventional example and in Embodiment 1 and Embodiment 2 are given the same part numbers, and their explanation is omitted here.

In FIG. 7, a maximum/minimum value detecting circuit 80 detects a maximum value and a minimum value of the focus error signal b from the focus error detecting circuit 12, under the condition that the reflected light quantity signal c from the reflected light quantity detection circuit 41 is greater than the predetermined value C1$v$1. A reflected light quantity difference detecting circuit 81 detects the difference ΔV in the level of the reflected light quantity signal c from the reflected light quantity detecting circuit 41 at the respective timings that the maximum/minimum value detecting circuit 80 detected the maximum value and the minimum value. A maximum value detecting circuit 82 detects the maximum value of the reflected light quantity signal c from the reflected light quantity detecting circuit 41 at all times, determines the maximum value at the timing that the focal point passage detecting signal d is output from the focal point passage detecting circuit 44, and sends that maximum value information to a normalizing circuit 83. The normalizing circuit 83 normalizes the difference ΔV in the level of the reflected light quantity from the reflected light quantity difference detecting circuit 81 by dividing it by the maximum value Vmax from the maximum value detecting circuit 82. An information surface discriminating circuit 84 discriminates whether or not this corresponds to the target information surface, by comparing the normalized reflected light quantity difference from the normalizing circuit 83 to a predetermined value Ncmp. The reversal instruction circuit 40 outputs a reversal instruction f at the timing of the first of either the output signal from the information surface discriminating circuit 84 or the output signal from the n-rotation delay circuit 70, and sends it to the focus pulling-in circuit 32C and the driving signal generating circuit 42C.

Next, the movement of the optical disk control device configured in the above manner is explained with reference to FIG. 7, FIG. 8A, FIG. 8B, and FIG. 9.

Figure 8A:
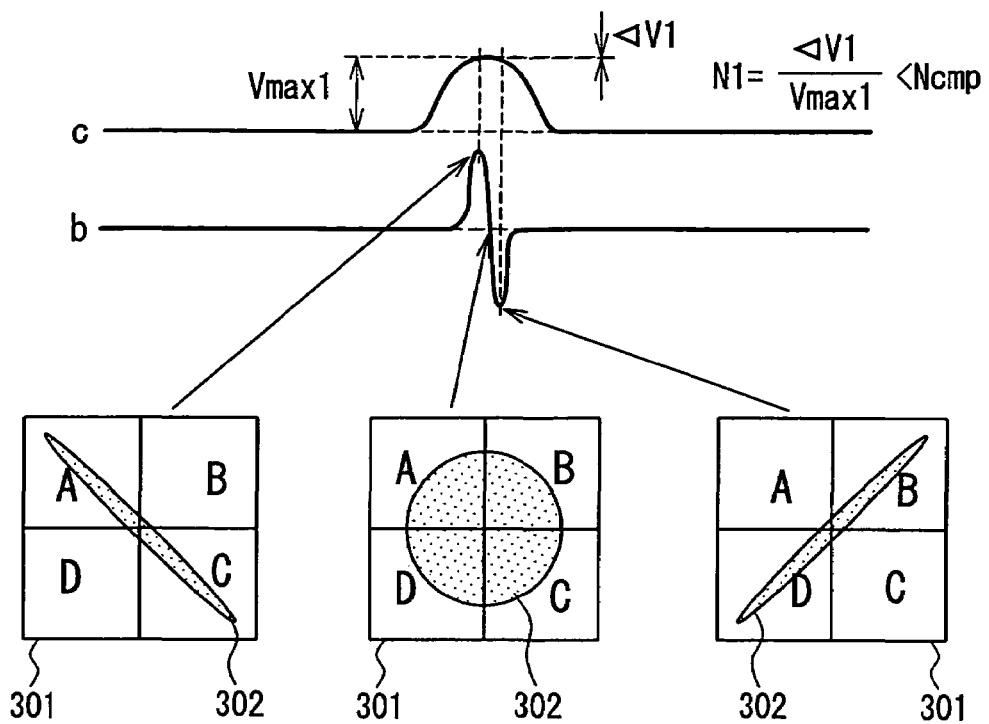
FIG. 8A is a diagram for explaining the relationship between the S-shaped waveform of the focus error signal b and the reflected light quantity signal c of FIG. 7 when there is no spherical aberration.
Figure 8B:
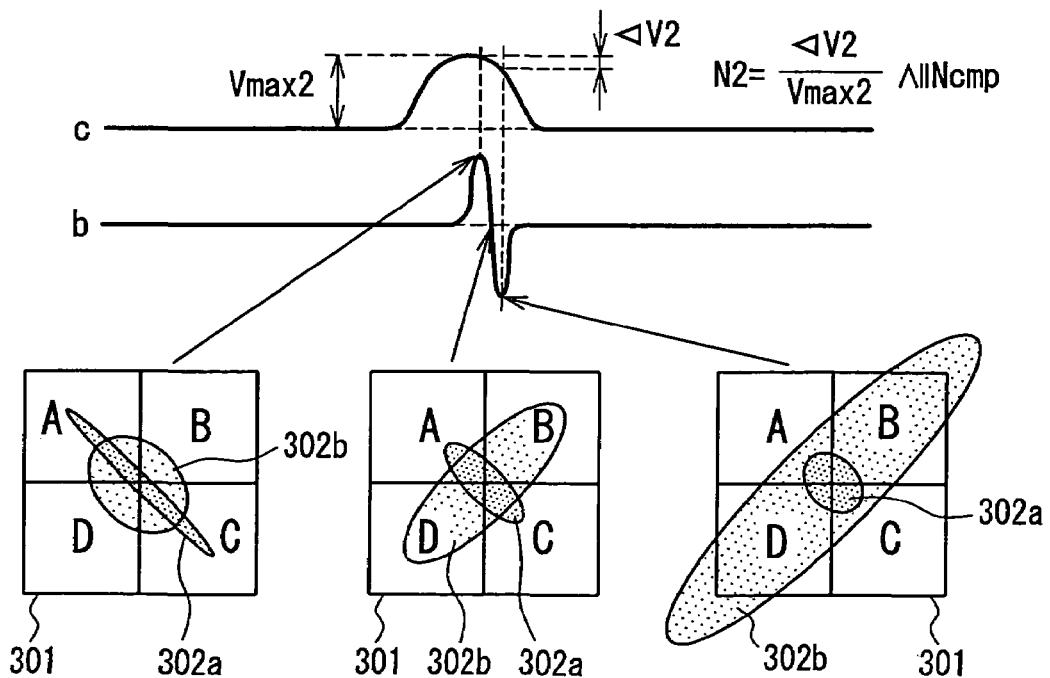
FIG. 8B is a diagram for explaining the relationship between the S-shaped waveform of the focus error signal b and the reflected light quantity signal c of FIG. 7 when there is spherical aberration.
Figure 9:
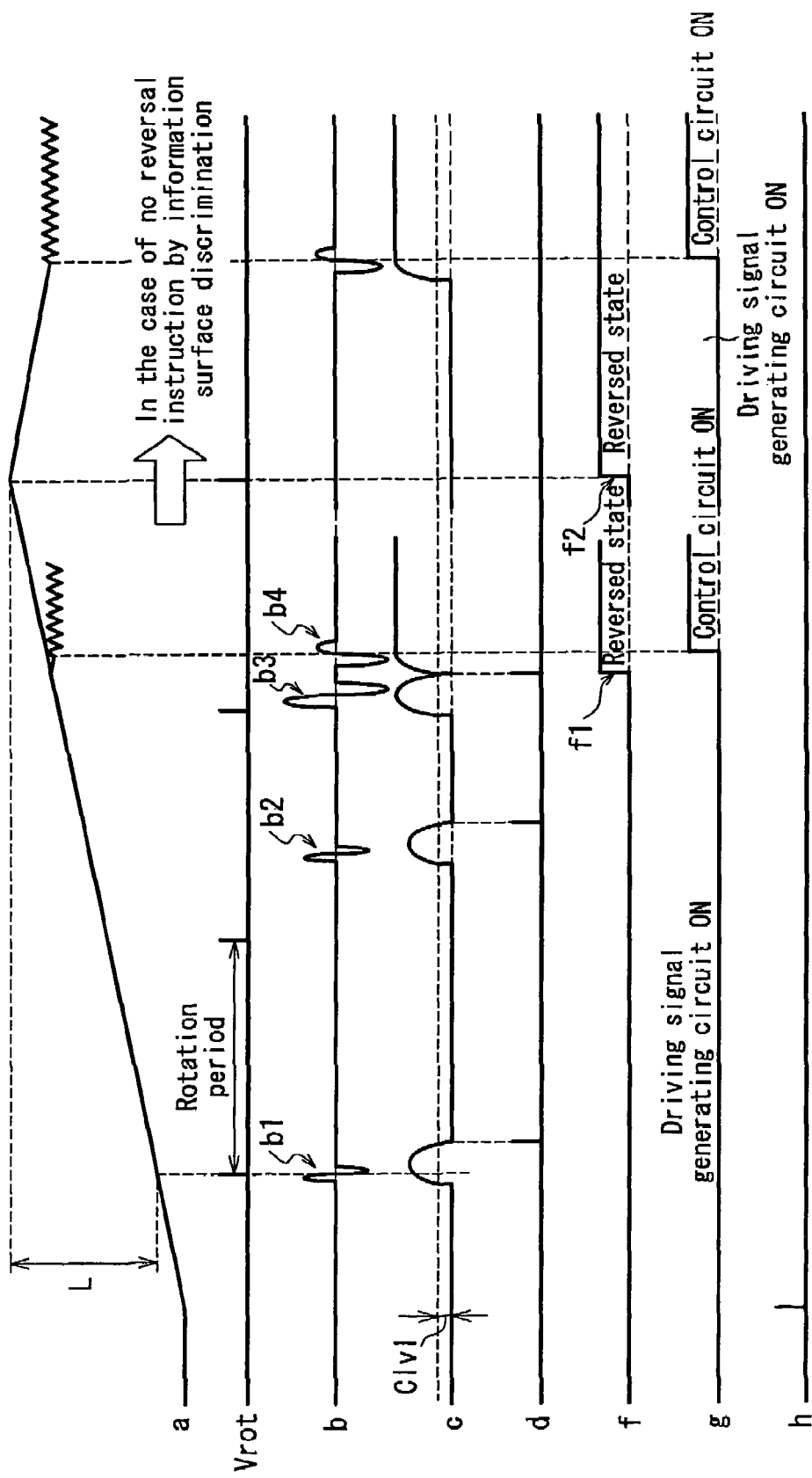
FIG. 9 is a waveform diagram of the various signals in the optical disk control device of FIG. 7 (for example, when the rotational velocity of the optical disk is comparatively fast).

FIG. 8A and FIG. 8B are, respectively, diagrams for explaining the relationship between the S-shaped waveform of the focus error signal b and the reflected light quantity signal c when there is no spherical aberration and when there is spherical aberration. FIG. 9 is a waveform diagram of the various signals in the optical disk control device of FIG. 7 (for example, when the rotational velocity of the optical disk 1 is comparatively fast).

In FIG. 9, first, the focus pulling-in instruction h is sent from the system controller 30 to the driving signal generating circuit 42C. The aberration setter 63 regulates aberration with the aberration regulator 65 via an aberration regulator driving circuit 64 such that there is no spherical aberration for the designated first information surface 1A. Then, the driving signal generating circuit 42C outputs a driving signal in the direction that moves the objective lens 23 toward the optical disk 1 at the lens movement velocity V1$ns$, calculated by the constant calculating circuit 71 using the equations (1) and (2) explained in Embodiment 2. When the objective lens 23 approaches the optical disk 1, the focal point passes the surface 1C and the second information surface 1B, and therefore S-shaped waveforms b1 and b2 are output from the focus error detecting circuit 12.

The S-shaped waveform when there is no spherical aberration and the S-shaped waveform when there is spherical aberration are explained here with reference to FIG. 8A and FIG. 8B.

FIG. 8A shows the shape of the light beam spot 302 on the quartered photodetector 301 at various points of the S-shaped waveform when there is no spherical aberration. When there is no spherical aberration, the light beam spot 302 is in the shape of a thin line at the peak and the bottom of the S-shaped waveform. On the other hand, FIG. 8B shows the shape of the light beam spot on the quartered photodetector 301 at various points of the S-shaped waveform when there is spherical aberration. When spherical aberration occurs, because the light beam is converged differently at the inner means and the outer periphery of the objective lens 23, a variation occurs in the optical power within the light beam spot (a light beam spot 302$a$ in the inner means and a light beam spot 302$b$ in the outer periphery). Then, the shape of the light beam spot does not become a thin line both at the peak and the bottom of the S-shaped waveform. Specifically, when the quartered photodetector 301 is made small, the light beam spot extends beyond the border of the quartered photodetector 301 at the bottom (or the peak) of the S-shaped waveform. On the other hand, at the peak (or the bottom) of the S-shaped waveform, even at a position further removed from the zero-crossing point, the shape of the light beam spot does not extend beyond the border of the quartered photodetector 301. That is, the rising phase of the S-shaped waveform of the focus error signal b is shifted from that of the reflected light quantity signal c.

In this manner, the phase of the S-shaped waveform becomes shifted from that of the reflected light quantity signal c for the surface 1C and the second information surface 1B in which spherical aberration are generated. The maximum/minimum value detecting circuit 80 (FIG. 7) detects the timing of the peaks and bottoms of these S-shaped waveforms, and the reflected light quantity difference detecting circuit 81 calculates the level difference ΔV of the reflected light quantity signal from the reflected light quantity detecting circuit at each timing. When the focal point passage detecting circuit 44 detects passage of the S-shaped waveform, the maximum value detecting circuit 82 fixes the maximum value Vmax and sends it to the normalizing circuit 83. The normalizing circuit 83 calculates a normalized data N (=ΔV/Vmax) from ΔV and Vmax, and the information surface discriminating circuit 84 compares the normalized data N (N2 of FIG. 8B) to the predetermined value Ncmp and determines that this S-shaped waveform does not correspond to the target first information surface 1A because the result is N2≧Ncmp.

Then, as shown in FIG. 9, when the objective lens 23 moves closer to the optical disk 1, its focal point moves past the first information surface 1A and therefore the S-shaped waveform b3 is output from the focus error detecting circuit 12. The same as in the case of the surface 1C and the second information surface 1B, the maximum/minimum value detecting circuit 80, the reflected light quantity difference detecting circuit 81 and the maximum value detecting circuit 82 operate, the information surface discriminating circuit 84 compares the normalized data point N (N1 of FIG. 8A) from the normalizing circuit 83 to the predetermined value Ncmp, and because the result is N1<Vcmp, determines that this S-shaped waveform does correspond to the target information surface 1A.

When the fact that the information surface discriminating circuit 84 has detected the target information surface 1A is transmitted to the reversal instruction circuit 40, the reversal instruction has not yet been output from the n-rotation delay circuit 70, and the reversal instruction circuit 40 outputs a reversal instruction f1 to the focus pulling-in circuit 32C and to the driving signal generating circuit 42C. The driving signal generating circuit 42C receives the reversal instruction f1 and switches the driving signal in the direction that moves the objective lens 23 away from the optical disk 1. At the same time, the focus pulling-in circuit 32C that received the reversal instruction f now can perform a focus pulling-in action by judging the level of the focus error signal b.

Then, the objective lens 23 starts to move in the direction away from the optical disk 1, and when the S-shaped waveform is output from the focus error detecting circuit 12, the focus pulling-in circuit 32C determines the level of the focus error signal b, and at a timing that the level reached the focus pulling-in level, outputs a switching instruction g1 to the switching circuit 31, and by starting up the control circuit 20 along with switching the signal "a" output to the actuator driving circuit 21 to the output signal of the control circuit 20 from the driving signal generating circuit 42C, performs a focus pulling-in action.

On the other hand, the same as in Embodiment 2, the n-rotation delay circuit 70 is provided in the present embodiment as well, and the number of rotations n, calculated by the constant calculating circuit 71 from the rotational velocity Vrot of the optical disk 1 using the equation (1), is set in the n-rotation delay circuit 70. After the zero-crossing point of the initially detected S-shaped waveform b1, the output signal is supplied to the reversal instruction circuit 40 after a time delay in which the optical disk makes n rotations. The reversal instruction circuit 40 ignores the input from the n-rotation delay circuit 70 when the information surface discrimination is done properly by the information surface discriminating circuit 84 and the reversal instruction already has been input. However, because of noise included in the reflected light quantity signal c, when the information surface discrimination is not performed properly by the information surface discriminating circuit 84 and the reversal instruction has not been input, a reversal instruction f2 is output by the input signal from the n-rotation delay circuit 70. The subsequent operation is the same as in Embodiment 2, and so that the explanation will be omitted here.

In the above manner, in the present embodiment, the objective lens 23 is moved toward the optical disk 1 by the output signal of the driving signal generating circuit 42C, the difference in the level of the reflected light quantity signal at the timing of the peak and the bottom of the focus error signal b is calculated, and by comparing that value normalized with the maximum value of the reflected light quantity to the predetermined value the target information surface is detected. Then, the objective lens 23 is driven such that it immediately changes direction and moves away from the optical disk 1 when the target information surface is detected, and using the focus error signal that is generated next, a focus pulling-in action is performed. Thus, because it is possible for the objective lens 23 to begin the focus pulling-in action immediately without repeating vertical movement, the time required for the focus pulling-in action can be shortened. Further, by moving the objective lens 23 toward the optical disk 1 and then immediately changing directions after detecting the target information surface, the objective lens 23 does not move unnecessarily close to the optical disk 1, and collisions between the objective lens 23 and the optical disk 1 can be prevented even when there is little WD.

And, when the focal point passage detecting circuit detects passage of the focal point position by using the reflected light quantity signal c from the reflected light quantity detecting circuit 41 in addition to the focus error difference signal b, noise in the focus error signal b is eliminated, and by reliably performing focal point detection, stable focus pulling-in can be realized.

Further, there may be a case where the reflected light quantity signal c contains noise that disturbs the normalized data N in which the difference in the level of the reflected light quantity signal is normalized with the maximum value of the reflected light quantity, and as a result the information surface discriminating circuit 84 fails to discriminate the information surface. Even in this case the reversal instruction is output by the n-rotation delay circuit 70. Therefore, along with being able to perform the focus pulling-in action reliably, it is possible to prevent the objective lens 23 from colliding with the disk 1, and a highly reliable optical disk control device can be realized.

When failing to discriminate the information surface, by setting the timing at which judgment of the level of the focus error signal b begins in order to change the direction of the objective lens 23 and pull the focus to be after n rotations (where n is an integer) of the optical disk 1 after the initial S-shaped wave crosses the zero point, even when the optical disk 1 has a component of vibration, the focal point is guaranteed to definitely be behind the first information surface 1A when beginning to determine the level of the focus error signal b. Thus, it is possible to perform a focus pulling-in action reliably for the information surface 1A without failure. Further, when failing to discriminate the information surface, the amount of movement of the objective lens 23 from detection of the initial S-shaped waveform until after n-rotations of the optical disk 1 can be kept at all times to the predetermined distance L, and it is possible to avoid having the objective lens 23 unnecessarily approach the optical disk 1.

In the present embodiment, the driving signal generating circuit 42C is explained as initially driving in the direction that moves the objective lens 23 toward the optical disk 1, but the present invention is not limited to this. In consideration of surface vibration of the optical disk 1, the driving signal generating circuit 42C also may drive such that initially it moves the objective lens 23 away from the optical disk 1 only a predetermined distance, and then such that it changes directions and moves the objective lens 23 toward the optical disk 1.

As a method that keeps the amount of movement of the objective lens 23 at the predetermined distance L, a configuration may be adopted such that the lens movement velocity V1$ns$ is fixed without relationship to the rotational velocity Vrot of the optical disk 1, and after the objective lens 23 moves for a predetermined distance L, it is stopped at its location after n-rotations of the optical disk 1, and changes direction after n-rotations of the optical disk 1 following detection of the initial S-shaped waveform, so that the present invention is not limited to the present embodiment. Likewise, it is possible to set the number of rotations n irrespective of the rotational velocity Vrot, and the present invention is not limited to the present embodiment.

Embodiment 4

Figure 10:
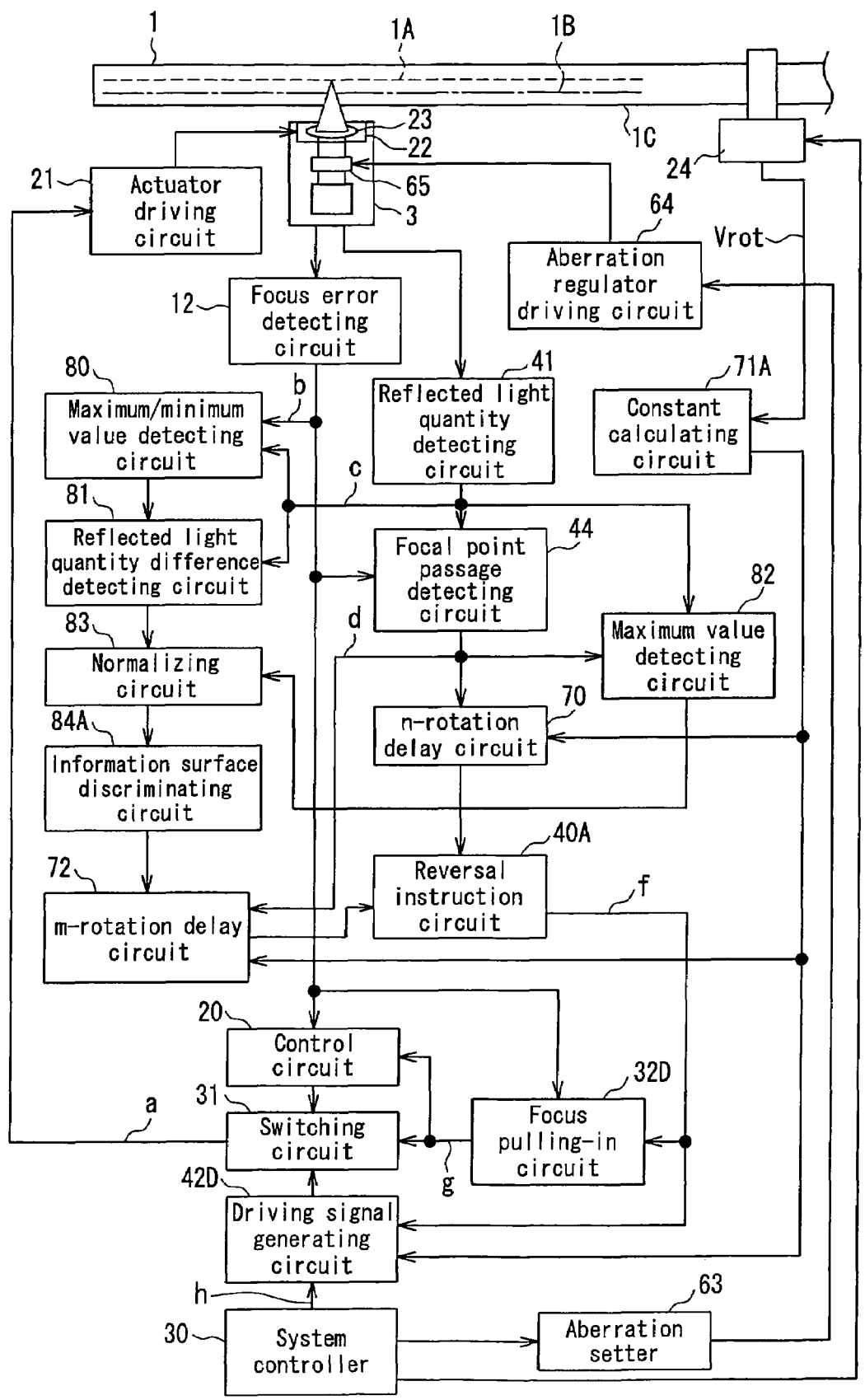
FIG. 10 is a block diagram showing one example of a configuration of the optical disk control device according to Embodiment 4 of the present invention.

FIG. 10 is a block diagram showing one example configuration of the optical disk control device according to Embodiment 4 of the present invention. In FIG. 10, the same essential elements of the configuration as in the conventional example, Embodiment 1, Embodiment 2, and Embodiment 3 are given the same part numbers, and their explanation is omitted here.

In FIG. 10, from the normalized reflected light quantity difference output by the normalizing circuit 83, an information surface discriminating circuit 84A discriminates that the S-shaped waveform is the S-shaped waveform from a surface other than the surface 1C, that is, the S-shaped waveform of the first information surface 1A or the second information surface 1B. In other words, in the present embodiment, in comparison to the information surface discriminating circuit 84 of Embodiment 3, the precision of information surface discrimination is poor, and it is presumed that there may be cases in which it is not possible to distinguish accurately between the second information surface 1B and the first information surface 1A.

As in Embodiment 3, until the information surface discriminating circuit 84A detects an S-shaped waveform other than that of the surface 1C, a constant calculating circuit 71A calculates the distance L, the number of rotations n, and the driving velocity V1$ns$ according to the above equations (1) and (2), and also, when the information surface discriminating circuit 84A detects an S-shaped waveform other than that of the surface 1C, calculates a number of rotations m set in an m-rotation delay circuit explained later, and a driving velocity V1$ns$2 of the objective lens 23 set in a driving signal generating circuit 42D, from a distance S that the objective lens 23 should move toward the optical disk 1 after detecting the S-shaped waveform of the second information surface 1B, and the rotational velocity Vrot of the disk motor 24, according to the below equations (3) and (4).

$$m = K \times S \times Vrot \quad (3)$$

$$V1ns2 = (S \times Vrot)/m \quad (4)$$

Here, as the predetermined distance S, a distance is secured over which the objective lens 23 must move in order to move the focal point of the objective lens 23 at least from the second information surface 1B to the first information surface 1A. The relationship between L and S is L>S, and when considering reliably moving a predetermined distance including individual variation, the difference between L and S becomes larger than the distance from the surface 1C to the second information surface 1B.

The m-rotation delay circuit 72 outputs a signal to the reversal instruction circuit 40A after m rotations of the disk 1 after the zero-crossing point of the initial S-shaped waveform of the first information surface 1A or the second information surface 1B, based on the output signal from the information surface discriminating circuit 84A and the output signal from the focal point passage detecting circuit 44.

The reversal instruction circuit 40A outputs the reversal instruction f at the timing of the first of either the output signal from the output signal from the n-rotation delay circuit 70 or the m-rotation delay circuit 72, and sends it to the focus pulling-in circuit 32A and the driving signal generating circuit 42D.

Figure 11:
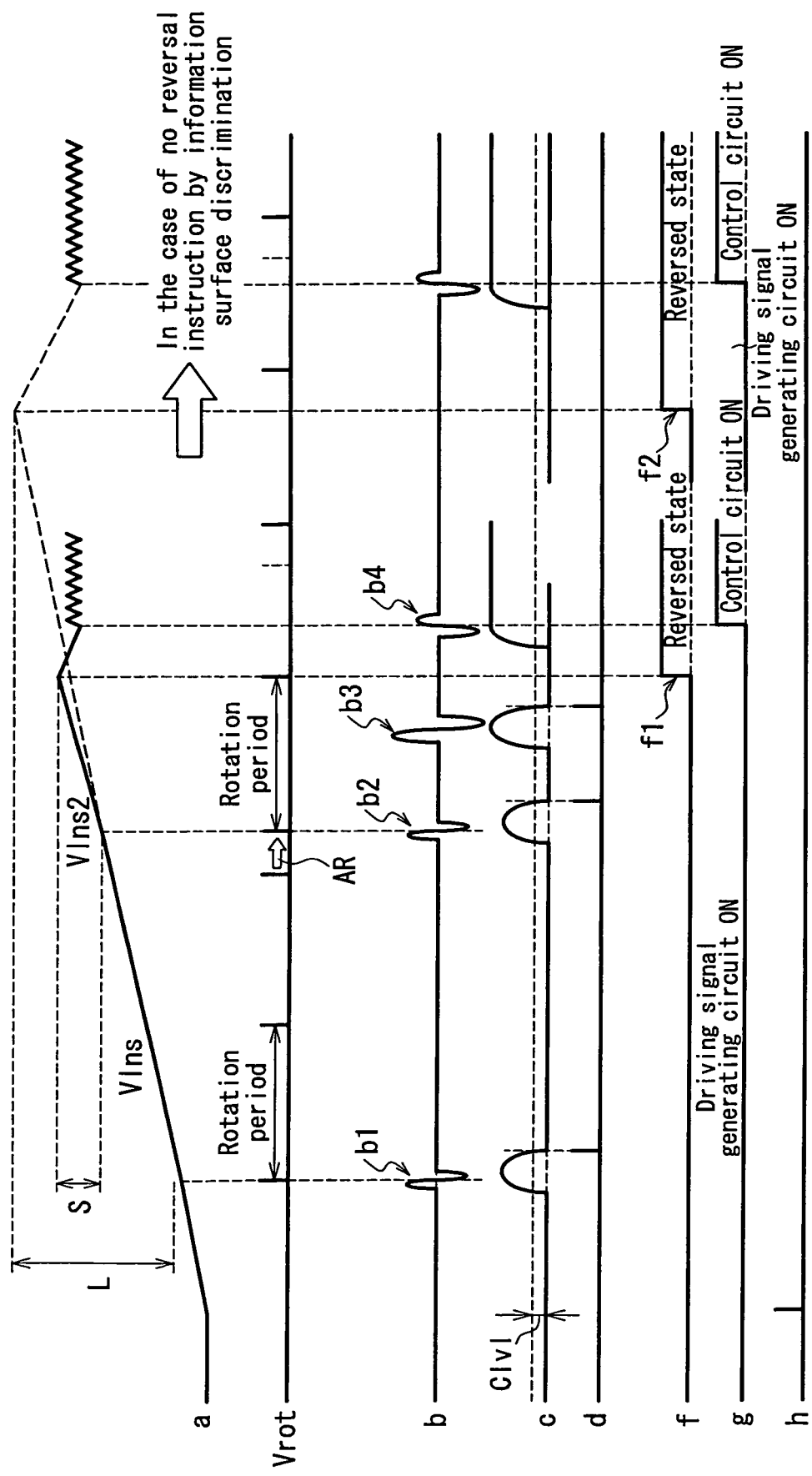
FIG. 11 is a waveform diagram of the signals in various parts of the optical disk control device of FIG. 10.

Next, the operation of the optical disk control device configured in the above manner is explained with reference to FIG. 11. FIG. 11 is a waveform diagram of the signals in various parts of the optical disk control device of FIG. 10.

In FIG. 11, the focus pulling-in instruction h is sent from the system controller 30 to the driving signal generating circuit 42D. The aberration setter 63 adjusts the aberration adjuster 65 such that there is no spherical aberration for the designated first information surface 1A. Then, the driving signal generating circuit 42D outputs a driving signal in the direction that moves the objective lens 23 toward the optical disk 1 at the lens movement velocity V1$ns$ calculated by the constant calculating circuit 71A using the equations (1) and (2). When the objective lens 23 approaches the optical disk 1, its focal point passes the surface 1C and the second information surface 1B, and therefore S-shaped waveforms b1 and b2 are output from the focus error detecting circuit 12.

The maximum/minimum value detecting circuit 80 detects the timing of the peak and the bottom of these S-shaped waveforms b1 and b2, and the reflected light quantity difference detecting circuit 81 detects the difference ΔV in the output values from the reflected light quantity detecting circuit 41 at those timings. When the focal point passage detecting circuit 44 detects passage of the S-shaped waveform, the maximum value detecting circuit 82 determines the maximum value Vmax and sends it to the normalizing circuit 83. The normalizing circuit 83 calculates the normalized data N (=ΔV/Vmax) from ΔV and Vmax, and by comparing the normalized data N from the information surface discriminating circuit 84A to the predetermined value Ncmp, determines that the second S-shaped waveform b2 does not correspond to the surface 1C. At this time, as shown by the arrow mark AR, when discrimination of the information surface is complete, the rotational phase signal of the disk motor 24 matches the zero-crossing point of the discriminated S-shaped waveform b2.

The constant calculating circuit 71A calculates the number of rotations m=1 and the velocity V1$ns$2 of the objective lens 23 from the rotational velocity Vrot of the disk 1 at that time using the above equations (3) and (4), and sets the results in the driving signal generating circuit 42D and the m-rotation delay circuit 72. The driving signal generating circuit 42D outputs a driving signal at the driving velocity V1$ns$2 that the constant calculating circuit 71A calculated, such that it moves the objective lens 23 toward the optical disk 1. The m-rotation delay circuit 72 outputs a signal to the reversal instruction circuit 40A after the time period in which the optical disk 1 makes one rotation, with the zero-crossing point of the S-shaped waveform b2 of the second information surface 1B as the origin point. This corresponds to the timing in which the objective lens 23 moved toward the optical disk 1 only the predetermined distance S after the second S-shaped waveform b2 was detected.

In the reversal instruction circuit 40A, in order for the output signal of the m-rotation delay circuit 72 to be input before the output signal of the n-rotation delay circuit 70, the reversal instruction circuit 40A outputs the reversal instruction f1 at the output timing of the m-rotation delay circuit 72. The driving signal generating circuit 42D receives the reversal instruction f1, and switches to a driving signal in the direction that moves the objective lens 23 away from the optical disk 1. At the same time, the focus pulling-in circuit 32D that received the reversal instruction f1 has become able to perform a focus pulling-in action by judging the level of the focus error signal b.

Then, the objective lens 23 starts to move in the direction away from the optical disk 1, and when the S-shaped waveform b4 is output from the focus error detecting circuit 12, the focus pulling-in circuit 32D determines the level of the focus error signal b4, and at the timing that the level reaches the focus pulling-in level, outputs the switching instruction g to the switching circuit 31, and by starting up the control circuit 20 along with switching the signal "a" output to the actuator driving circuit 21 to the output signal of the control circuit 20 from the driving signal generating circuit 42D, performs a focus pulling-in action.

On the other hand, in the present embodiment, the same n-rotation delay circuit 70 is provided as in Embodiment 1 and Embodiment 2. When the information surface discrimination cannot be performed by the information surface discriminating circuit 84 due to causes such as noise included in the output signal from the reflected light quantity detecting circuit 41, the reversal instruction f is output by the input signal from the n-rotation delay circuit 70.

In the above manner, with the present embodiment, the objective lens 23 is moved toward the optical disk 1 by the output signal of the driving signal generating circuit 42D, and the difference in the reflected light quantity at the timing of the peak and the bottom of the focus error signal b is calculated, and that result is normalized with the maximum value of the reflected light quantity and compared to a predetermined value. By doing so, after the information surface detecting circuit 84A detects an information surface other than the surface 1C, the m-rotation delay circuit 72 outputs a signal after 1 (=m) rotations, and the reversal instruction circuit 40A outputs the reversal instruction f Thereby, by moving the objective lens 23 toward the objective lens 23 for the predetermined distance S after detecting the second information surface 1B, even if the precision of the information surface discriminating circuit 84A is low, the objective lens 23 does not approach the optical disk 1, and it is possible to prevent the objective lens 23 from colliding with the optical disk 1 even when there is a short WD.

Moreover, for the focal point passage detecting circuit 44 to detect passage of the focal point position, by using the focus error signal b combined with the reflected light quantity signal c, noise is eliminated in the focus error signal b, and by performing reliable focal point detection, it is possible to realize stable focus pulling-in.

Further, there may be a case where the reflected light quantity signal c contains noise that disturbs the normalized data N in which the difference in the level of the reflected light quantity signal is normalized with the maximum value of the reflected light quantity, and as a result the information surface discriminating circuit 84 fails to discriminate the information surface. Even in this case the reversal instruction is output by the n-rotation delay circuit 70. Therefore, along with being able to perform the focus pulling-in action reliably, it is possible to prevent the objective lens 23 from colliding with the disk 1, and a highly reliable optical disk control device can be realized.

By setting the timing that begins the judgment of the level of the focus error signal b in order to change the direction of the objective lens 23 and pull focus to be after n rotations (n being an integer) of the optical disk 1 after the zero-crossing point of the initial S-shaped waveform b1, and after m rotations (m being an integer) of the optical disk 1 after the zero-crossing point of an S-shaped waveform other than that of the surface 1C, even when the optical disk 1 has a component of vibration, when beginning to determine the level of the focus error signal b, the focal point is guaranteed definitely to be behind the first information surface 1A, and it is possible to pull the focus to the information surface 1A reliably.

By calculating the number of rotations n and m, and the lens movement velocities V1$ns$ and V1$ns2$, from the rotational velocity of the optical disk 1, a nearly fixed value can be maintained for the lens movement velocities V1$ns$ and V1$ns2$ even if there is a difference in the rotational velocity Vrot of the optical disk 1, and so it is possible to ensure reliability when pulling the focus.

Further, the amount of movement of the objective lens 23 from detection of the initial S-shaped waveform until after n rotations of the optical disk 1, and the amount of movement of the objective lens 23 from detection of the initial S-shaped waveform other than that of the surface 1C until after m rotations of the optical disk 1, respectively can be kept at all times to the predetermined distances L and S, and it is possible to avoid having the objective lens 23 unnecessarily approach the optical disk 1.

In the present embodiment, the driving signal generating circuit 42D is explained as initially driving in the direction that moves the objective lens 23 toward the optical disk 1, but the present invention is not limited to this. In consideration of surface vibration of the optical disk 1, the driving signal generating circuit 42C may also drive such that initially it moves the objective lens 23 away from the optical disk 1 only a predetermined distance, and then such that it changes directions and moves the objective lens 23 toward the optical disk 1.

As a method that keeps the amount of movement of the objective lens 23 at the predetermined distance L or S, a configuration may be adopted such that the lens movement velocity V1$ns$ or V1$ns2$ is fixed without relationship to the rotational velocity Vrot of the optical disk 1, and after the objective lens 23 moves for a predetermined distance L or S, it is stopped at its position after n or m rotations of the optical disk 1, and changes direction after n or m rotations, so that the configuration is not limited to the present embodiment. Likewise, it is possible to set the number of rotations n or m irrespective of the rotational velocity Vrot, and the configuration of the present invention is not limited to the present embodiment.

Embodiment 5

Figure 12:
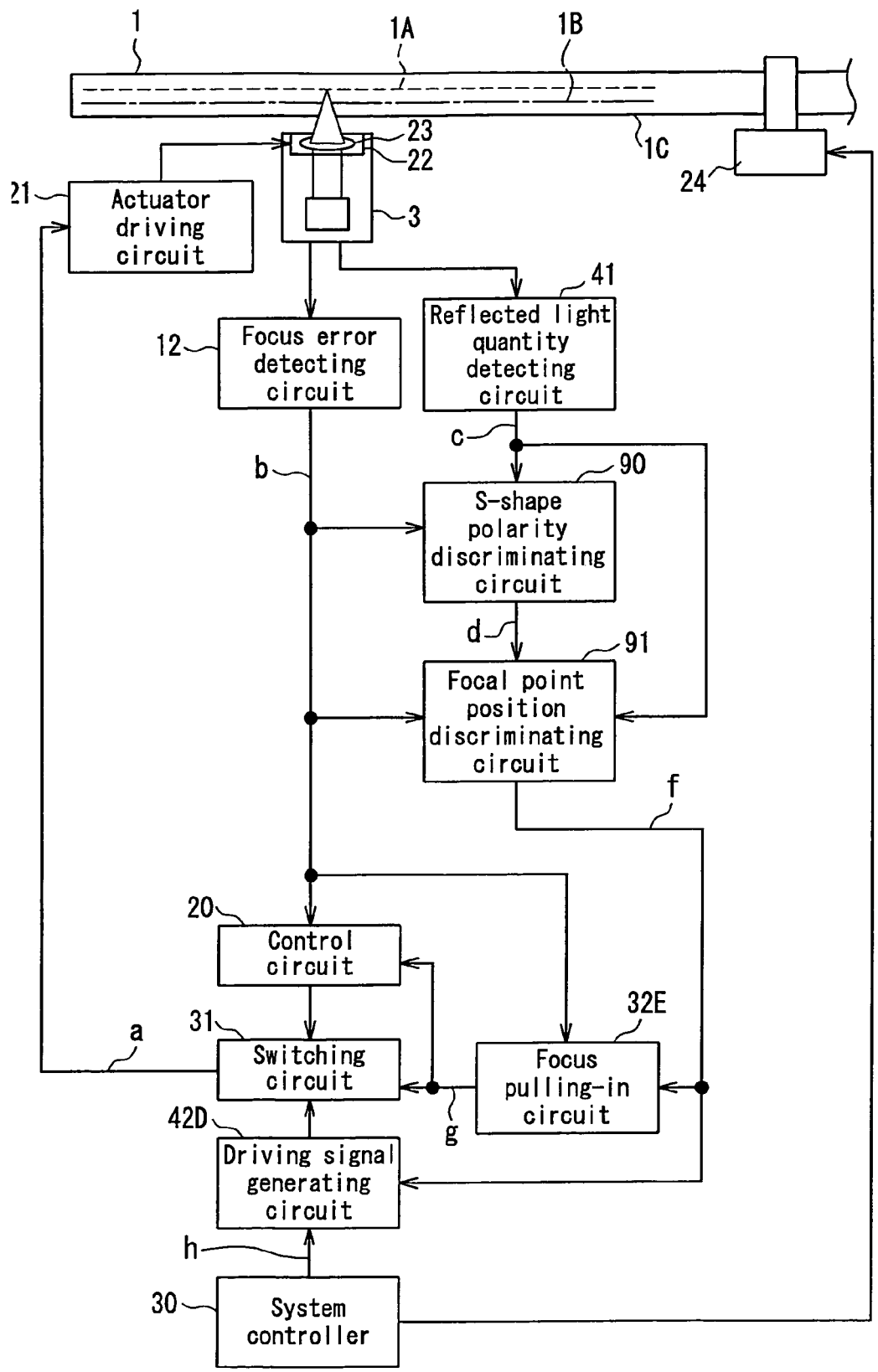
FIG. 12 is a block diagram showing one example of a configuration of the optical disk control device according to Embodiment 5 of the present invention.

FIG. 12 is a block diagram showing one example configuration of the optical disk control device according to Embodiment 5 of the present invention. In FIG. 12, the same essential elements of the configuration as in the conventional example, Embodiment 1, Embodiment 2, Embodiment 3, and Embodiment 4 are given the same part numbers, and their explanation is omitted here.

Under the condition that the reflected light quantity signal c from the reflected light quantity detecting circuit 41 is greater than the predetermined value C1v1 and based on the order in which the maximum and minimum values of the focus error signal b from the focus error detecting circuit 12 are shown, an S-shape polarity discriminating circuit 90 outputs, for example, +1 when a minimum value is given following a maximum value, and −1 when a maximum value is given following a minimum value. When the reflected light quantity signal c has become less than the predetermined value C1v1, a focal point position discriminating circuit 91 adds the output signal from the S-shape polarity discriminating circuit 90, and along with discriminating the present focal position based on that added value, thereby detects that the focal point has passed the information surface and outputs the reversal instruction f A driving signal generating circuit 42E outputs a signal that moves the objective lens 23 toward or away from the optical disk 1.

Next, the action of the optical disk control device configured in the above manner will be explained with reference to, in addition to FIG. 12, the waveform diagram of FIG. 13.

Figure 13:
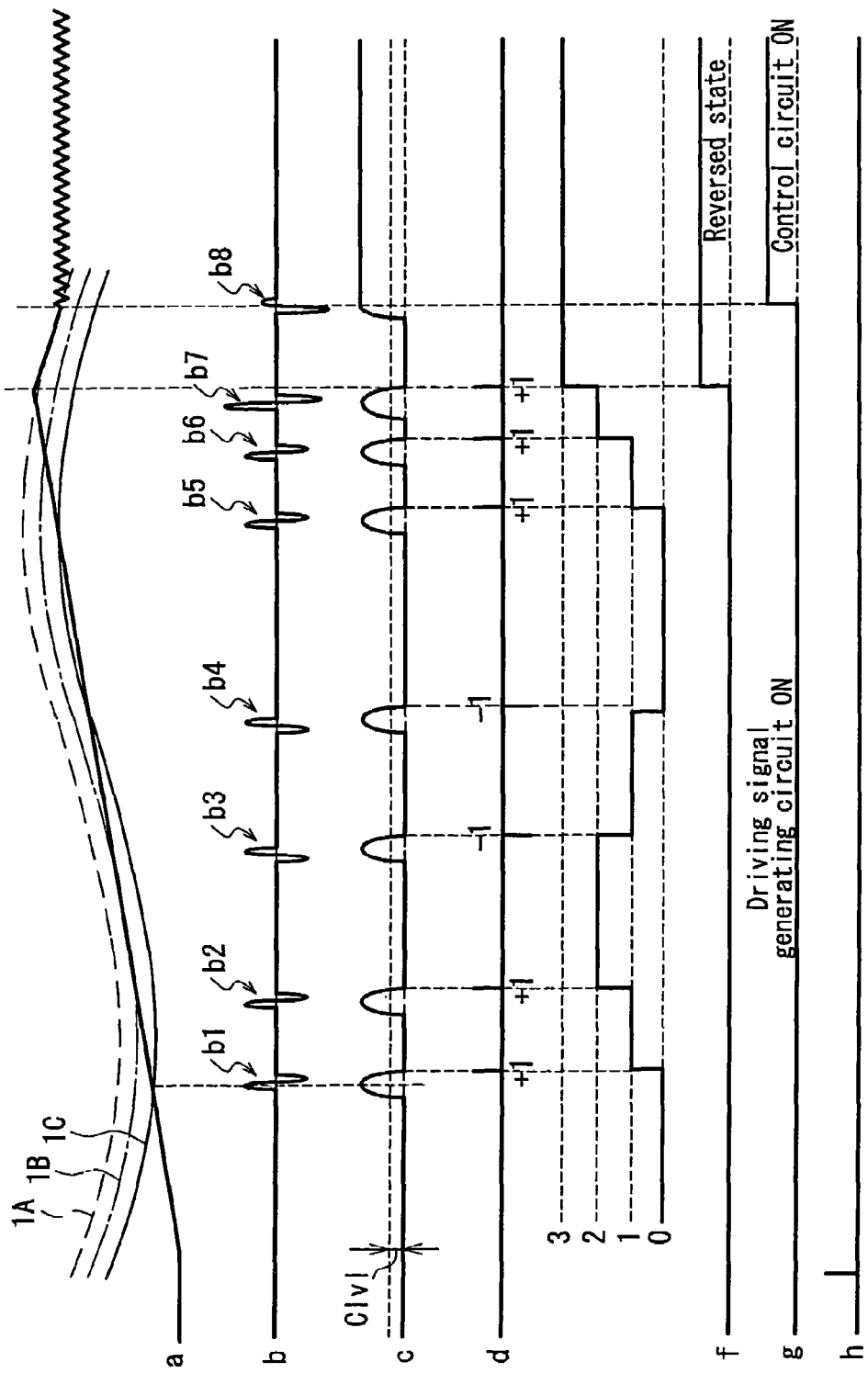
FIG. 13 is a waveform diagram of the various signals of FIG. 12 when there is surface oscillation on the optical disk.
Figure 14:
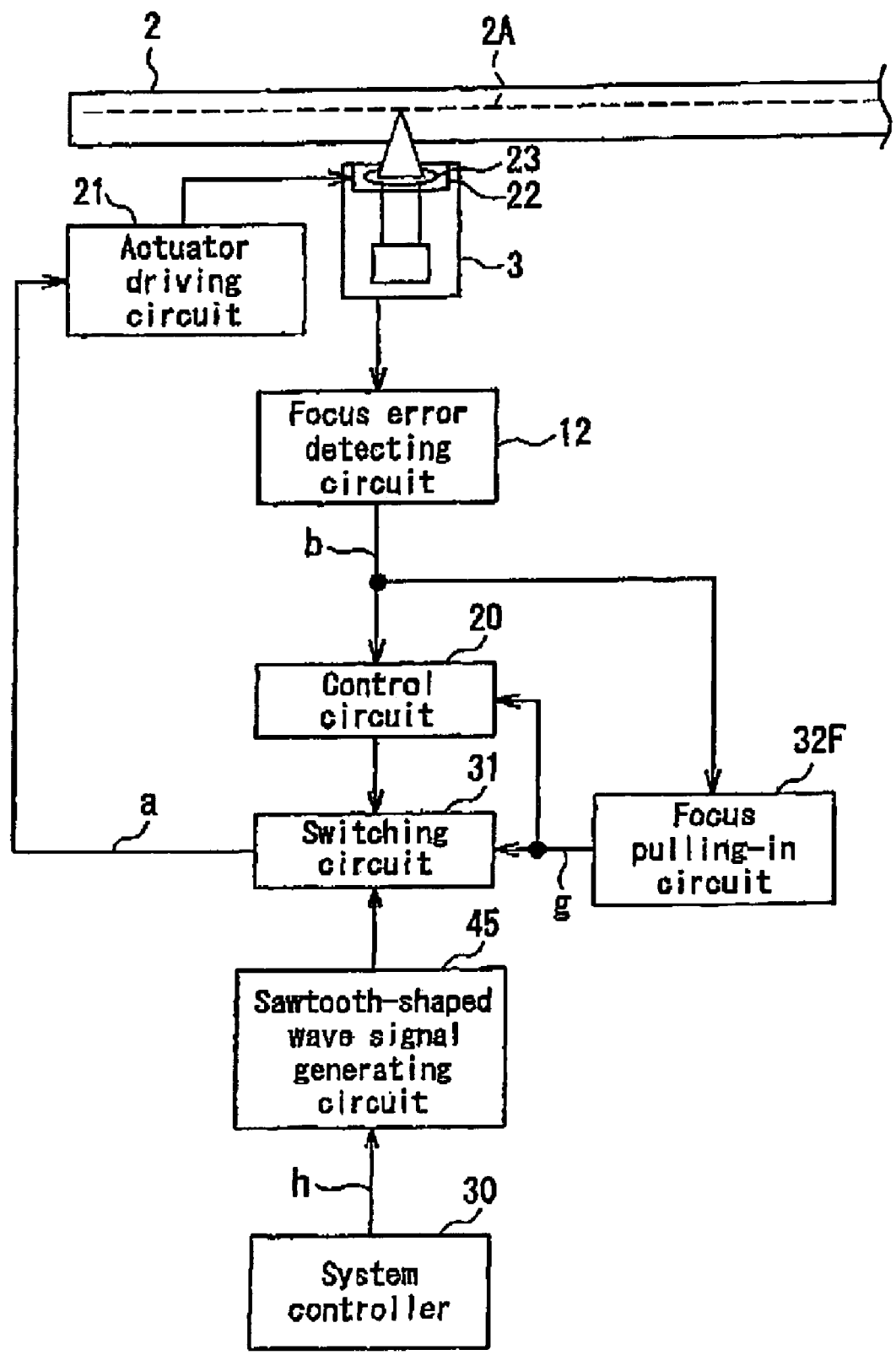
FIG. 14 is a block diagram showing an example of a configuration of a conventional optical disk control device.
Figure 15:
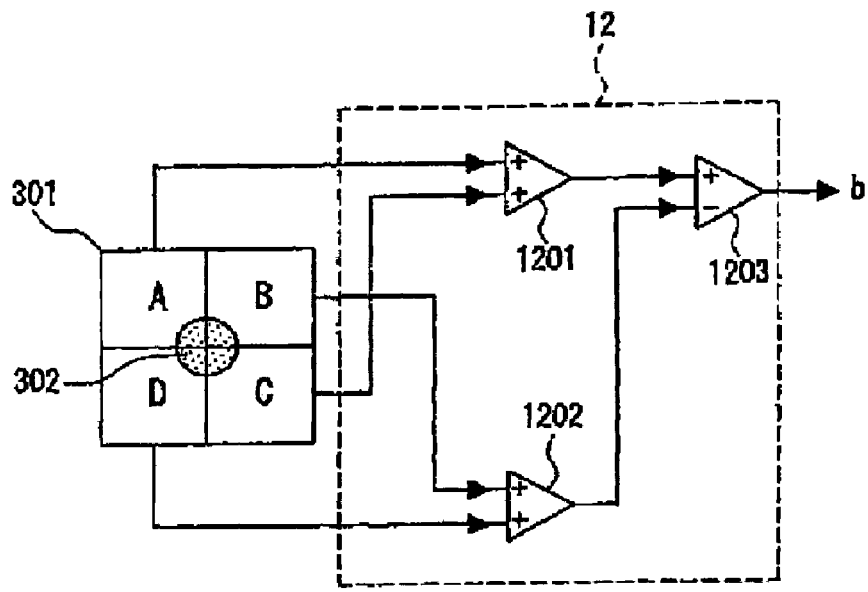
FIG. 15 is a circuit diagram showing an example internal configuration of the focus error detecting circuit 12 in FIG. 14.
Figure 16:
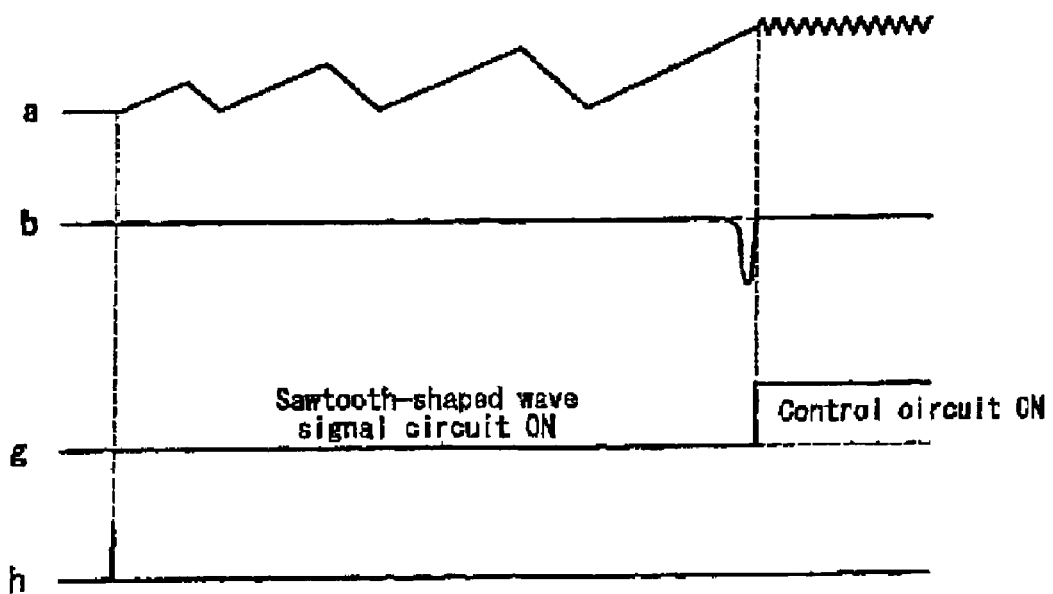
FIG. 16 is a waveform diagram of the signals in various parts of the optical disk control device of FIG. 14.

In FIG. 13, the optical disk 1 has a component of surface vibration, and the vertical vibration of the portion where the laser beam is incident due to rotation of the optical disk 1 is shown schematically by the sine waves overlapping the output signal "a" of the driving signal generating circuit 42E in FIG. 13. Among these sine waves, the solid line, the broken line, and the alternate long and short dashed line respectively show the vibration components of the surface 1C, the second information surface 1B, and the first information surface 1A.

First, a focus pulling-in instruction h is sent to the driving signal generating circuit 42E from the system controller 30. The driving signal generating circuit 42E outputs a driving signal in the direction that moves the objective lens toward the optical disk 1 at a predetermined velocity. When the objective lens 23 approaches the optical disk 1, by its focal point passing the surface 1C, an S-shaped waveform b1 in which the minimum value follows the maximum value is output from the focus error detecting circuit 12, and the S-shape polarity discriminating circuit 90 outputs +1. At this point in time, the count value in the focal point position discriminating circuit 91 becomes +1.

Further, when the objective lens 23 approaches the optical disk 1, by its focal point passing the second information surface 1B, an S-shaped waveform b2 in which the minimum value follows the maximum value is output from the focus error detecting circuit 12, and again the S-shape polarity discriminating circuit 90 outputs +1. At this point in time, the count value in the focal point position discriminating circuit 91 becomes +2.

When, in this state, driving the objective lens 23 in the direction that moves the objective lens 23 toward the optical disk 1, the distance between the objective lens 23 and the optical disk 1 increases due to surface vibration of the optical disk 1, and due to the focal point passing the information surface 1B and the surface C one after another, an S-shaped waveform in which the maximum value follows the minimum value is output from the focus error detecting circuit 12 two times in succession (b3, b4), and the S-shape polarity discriminating circuit 90 outputs −1 two times. Thereby, the count value in the focal point position discriminating circuit 91 changes to +1 and then to 0.

When, in that state, the objective lens 23 is driven in the direction that moves it toward the optical disk 1, shaking of the optical disk 1 due to surface vibration subsides, the focal point passes the surface 1C (S-shaped waveform b5), the second information surface 1B (S-shaped waveform b6), and the first information surface 1B (S-shaped waveform b7) one after another, and the S-shape polarity discriminating circuit 90 outputs +1 at those instances. At that time, the count value within the focal point position discriminating circuit 91 changes to +1, +2, then +3, and at the timing that the count value becomes +3, outputs the reversal instruction f to a focus pulling-in circuit 32E and the driving signal generating circuit 42E.

The driving signal generating circuit 42E receives the reversal instruction f, and switches to a driving signal in the direction that moves the objective lens 23 away from the optical disk 1. At the same time, the focus pulling-in circuit 32E that received the reversal instruction f has become able to perform a focus pulling-in action by judging the level of the focus error signal b.

Then, the objective lens 23 begins to move in the direction away from the optical disk 1, and when an S-shaped waveform b8 is output from the focus error detecting circuit 12, the focus pulling-in circuit 32E determines the level of the focus error signal b8, outputs the switching instruction g to the switching circuit 31 at the timing that the level reaches the focus pulling-in level, and along with switching the signal "a" that is output to the actuator driving circuit 21 to the output signal of the control circuit 20 from the driving signal generating circuit 42E, performs a focus pulling-in action by starting up the control circuit 20.

In the above manner, in the present embodiment, the objective lens 23 is moved toward the optical disk 1 by the output signal of the driving signal generating circuit 42E, and the S-shape polarity is discriminated from the order that the peak and the bottom of the focus error signal b are shown. Then the position of the focal point is determined from the result of that discrimination, so that the target information surface is detected. Next, the objective lens 23 is driven such that it changes directions immediately after the target information surface is detected and moves away from the optical disk 1, and then performs a focus pulling-in action using the generated focus error signal b. Accordingly, because it is possible for the objective lens 23 to begin the focus pulling-in action immediately without repeating vertical action, it is possible to shorten the time required for the focus pulling-in action. Further, when the objective lens 23 is moved toward the optical disk 1, by changing the direction of the objective lens 23 immediately after detecting the target information surface, the objective lens 23 does not move unnecessarily close to the optical disk 1, and it is possible to prevent collisions between the objective lens 23 and the optical disk 1 even when there is a short WD.

In the respective actions of the S-shape polarity discriminating circuit 90 and the focal point position discriminating circuit 91, in addition to the focus error signal b, by using the reflected light quantity signal c from the reflected light quantity detecting circuit 41, noise in the focus error signal b is eliminated, and by performing a reliable action, stable focus pulling-in can be realized.

In the present embodiment, the driving signal generating circuit 42E is explained as initially driving in the direction that moves the objective lens 23 toward the optical disk 1, but the present invention is not limited to this. In consideration of surface vibration of the optical disk 1, the driving signal generating circuit 42E also may drive such that initially it moves the objective lens 23 away from the optical disk 1 only a predetermined distance, and then such that it changes directions and moves the objective lens 23 toward the optical disk 1.

As explained above, with the present invention, because it is possible for the objective lens to begin the focus pulling-in action immediately without repeating vertical action, it is possible to shorten the time required for the focus pulling-in action.

Also, without the objective lens moving unnecessarily close to the optical disk, it is possible to prevent collisions between the objective lens and the optical disk even when there is short WD.

Further, the target information surface can be detected reliably even for an optical disk having a plurality of information surfaces inside, and a reliable focus pulling-in action becomes possible.

The invention claimed is:

1. An optical disk control device comprising:
    a converging projecting means that converges and projects a light beam via an objective lens to an information carrier having a plurality of information surfaces;
    a spherical aberration regulating means that sets the amount of spherical aberration of the focal point of the light beam that is converged by the converging projecting means, according to a target surface;
    a focus-moving means that, by moving the objective lens, moves the focal point of the light beam converged by the converging projecting means in a direction normal to the surface of the information carrier;
    a focus error detecting means that generates a focus error signal in response to the positional displacement of the focal point of the light beam with respect to the surfaces of the information carrier;
    a reflected light quantity detecting means that detects a signal corresponding to the amount of light reflected from the information carrier;
    a phase relationship detecting means that detects the phase relationship between the focus error signal and the reflected light quantity signal based upon the level of the reflected light quantity signal from the reflected light quantity detecting means when the focus error signal takes a maximum value and a minimum value and the maximum value of the reflected light quantity signal from the reflected light quantity detecting means;
    an information surface discriminating means that detects the target surface from the plurality of information surfaces of the information carrier based upon the phase relationship output from the phase relationship detecting means;
    a reversal instruction means that outputs a reversal instruction using the output signal from the information surface detecting means;
    a driving signal generating means, that, along with outputting a signal to the focus moving means to move the objective lens toward the information carrier, switches the signal so as to move the objective lens away from the information carrier in response to the reversal instruction, and outputs that signal;
    a controlling means that, using the focus error signal, controls the focus moving means such that the focal point follows each of the information surfaces of the information carrier; and
    a focus pulling-in means that switches an object of the operation from the driving signal generating means to the controlling means, and lets the focus moving means perform a focus pulling-in action.

2. The optical disk control device according to claim 1, wherein the driving signal generating means outputs a signal having a slope of the driving waveform that changes when switching the signal in response to the reversal instruction.

3. An optical disk control device comprising:
    a converging projecting means that converges and projects a light beam via an objective lens to an information carrier having a plurality of information surfaces;
    a focus-moving means that, by moving the objective lens, moves the focal point of the light beam converged by the converging projecting means in a direction normal to the surface of the information carrier;
    a focus error detecting means that generates a focus error signal in response to the positional displacement of the focal point of the light beam with respect to the surfaces of the information carrier;
    a focal point passage detecting means that detects that the focal point of the light beam has passed the surface and the information surfaces of the information carrier;
    a reversal instruction means that outputs a reversal instruction using the output signal from the focal point passage detecting means;
    a driving signal generating means, that, along with outputting a signal to the focus moving means to move the objective lens toward the information carder, switches the signal so as to move the objective lens away from the information carrier in response to the reversal instruction, and outputs that signal;
    a controlling means that, using the focus error signal, controls the focus moving means such that the focal point follows each of the information surfaces of the information carrier;
    a focus pulling-in means that switches an object of the operation from the driving signal generating means to the controlling means, and lets the focus moving means perform a focus pulling-in action; and
    a movement amount managing detecting means A that manages and detects that the focal point moves a predetermined amount after the focal point passage detecting means detects passage of the focal point,
    wherein the reversal instruction means outputs a reversal instruction based upon the output signal from the movement amount managing detecting means A.

4. The optical disk control device according to claim 3, further comprising an information surface discriminating means that discriminates whether or not the surface that the focal point passage detecting means has detected is the target surface for which focus pulling-in is to be performed, wherein the reversal instruction means outputs a reversal instruction using the output signal from the information surface discriminating means in addition to the output signal from the movement amount managing detecting means A.

5. The optical disk control device according to claim 3, further comprising a velocity setting means that calculates the velocity that will drive the objective lens in response to the rotational velocity of the information carrier, and sets the calculated velocity in the driving signal generating means.

* * * * *